US010308039B2

(12) United States Patent
Mathis

(10) Patent No.: US 10,308,039 B2
(45) Date of Patent: Jun. 4, 2019

(54) SYSTEM FOR PRINTING IMAGES ON A SURFACE AND METHOD THEREOF

(71) Applicant: The Boeing Company, Chicago, IL (US)

(72) Inventor: Dennis R. Mathis, Charleston, SC (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 15/919,215

(22) Filed: Mar. 13, 2018

(65) Prior Publication Data

US 2018/0201029 A1 Jul. 19, 2018

Related U.S. Application Data

(60) Continuation-in-part of application No. 15/244,967, filed on Aug. 23, 2016, now Pat. No. 9,937,731, (Continued)

(51) Int. Cl.
*B23K 26/02* (2014.01)
*B23K 26/08* (2014.01)
(Continued)

(52) U.S. Cl.
CPC ............... *B41J 3/4073* (2013.01); *B41J 2/01* (2013.01); *B41J 2/2132* (2013.01); *B41J 2/442* (2013.01)

(58) Field of Classification Search
CPC ........ B23K 26/02–032; B23K 26/0344; B23K 26/04–044; B23K 26/08–082; B23K 26/14–146; B33Y 10/00; B33Y 30/00
See application file for complete search history.

(56) References Cited

U.S. PATENT DOCUMENTS

| | | | |
|---|---|---|---|
| 5,931,098 A | 8/1999 | Bates | |
| 6,090,158 A * | 7/2000 | McLaughlin | D06C 23/02 223/1 |

(Continued)

FOREIGN PATENT DOCUMENTS

| | | |
|---|---|---|
| CN | 103660658 | 3/2014 |
| EP | 0455371 | 11/1991 |

(Continued)

OTHER PUBLICATIONS

Williams, "The Delta Parallel Robot: Kinematics Solutions", Internet Publication, www.ohio.edu/people/williar4/html/pdf/DeltaKin.pdf, Apr. 2015.

(Continued)

*Primary Examiner* — Michael A LaFlame, Jr.

(57) ABSTRACT

A system for printing an image includes a robot, a printhead, a laser device, and a reference line sensor. The robot has at least one arm. The printhead is mounted to the arm and is movable by the arm over a surface along a rastering path while printing a new image slice over the surface. The laser device is configured to etch, during printing of the new image slice, a reference line into either the new image slice or into a basecoat at a location adjacent to the new image slice. The reference line sensor is configured to sense the reference line of an existing image slice and transmit a signal to the robot causing the adjustment of the printhead in a manner such that a side edge of the new image slice is aligned with the side edge of the existing image slice.

20 Claims, 23 Drawing Sheets

Related U.S. Application Data which is a division of application No. 14/726,387, filed on May 29, 2015, now Pat. No. 9,452,616.

(51) Int. Cl.

| | |
|---|---|
| ***B33Y 10/00*** | (2015.01) |
| ***B33Y 30/00*** | (2015.01) |
| ***B41J 3/407*** | (2006.01) |
| ***B41J 2/01*** | (2006.01) |
| ***B41J 2/21*** | (2006.01) |
| ***B41J 2/44*** | (2006.01) |

(56) References Cited

U.S. PATENT DOCUMENTS

| | | | | |
|---|---|---|---|---|
| 6,508,531 | B1 | 1/2003 | Gargir | |
| 7,350,890 | B2 | 4/2008 | Baird et al. | |
| 8,088,450 | B2 | 1/2012 | Swanberg et al. | |
| 9,221,506 | B1 * | 12/2015 | Georgeson | B05C 1/00 |
| 2003/0001925 | A1 * | 1/2003 | Ogawa | B41J 2/4155 347/55 |
| 2007/0151963 | A1 * | 7/2007 | Tanaka | B23K 26/06 219/121.78 |
| 2009/0111701 | A1 | 4/2009 | Ahn | |
| 2012/0092403 | A1 | 4/2012 | Profaca | |
| 2013/0015292 | A1 | 1/2013 | Zielinski | |
| 2013/0209602 | A1 * | 8/2013 | Nye | B41J 3/4073 425/457 |
| 2014/0042132 | A1 * | 2/2014 | Boisvert | B21D 43/022 219/121.68 |
| 2014/0061173 | A1 * | 3/2014 | Trzcinski | B23K 37/0417 219/121.82 |
| 2014/0063096 | A1 | 3/2014 | Pitz | |
| 2014/0139608 | A1 * | 5/2014 | Rosario | B23K 26/0006 347/225 |
| 2014/0139851 | A1 | 5/2014 | Mizes | |
| 2014/0214184 | A1 | 7/2014 | Freeman | |
| 2014/0327844 | A1 * | 11/2014 | Hwang | G06F 3/047 349/12 |
| 2016/0136715 | A1 * | 5/2016 | Liebel | B21D 35/001 72/337 |
| 2016/0141200 | A1 * | 5/2016 | Takano | H01L 21/68764 451/70 |
| 2016/0324586 | A1 * | 11/2016 | Zingaretti | A61B 17/32053 |
| 2017/0087873 | A1 * | 3/2017 | Freybler | F41A 35/00 |
| 2017/0304946 | A1 * | 10/2017 | Shibazaki | B33Y 10/00 |

FOREIGN PATENT DOCUMENTS

| | | |
|---|---|---|
| EP | 2208541 | 7/2010 |
| EP | 2839964 | 2/2015 |

OTHER PUBLICATIONS

Wikipedia, "Delta Robot," <http://en.wikipedia.org/wiki/Delta_robot>, retrieved May 13, 2015.

European Search Report, EP16160553, dated Sep. 30, 2016.

Russian Office Action, 2016107611/12(012053), dated Sep. 13, 2017.

Chinese Office Action, Application No. 2016102594770, dated Dec. 28, 2018.

* cited by examiner

SYSTEM FOR PRINTING IMAGES ON A SURFACE AND METHOD THEREOF

CROSS-REFERENCE TO RELATED APPLICATIONS

The present application is a continuation-in-part application of and claims priority to pending U.S. application Ser. No. 15/244,967 filed on Aug. 23, 2016, and entitled AUTOMATED SYSTEM AND METHOD FOR PRINTING IMAGES ON A SURFACE, which is a divisional application of and claims priority to U.S. application Ser. No. 14/726,387 filed on May 29, 2015, now U.S. Pat. No. 9,452,616 issued on Sep. 27, 2016, and entitled SYSTEM AND METHOD FOR PRINTING AN IMAGE ON A SURFACE, the entire contents of each one of the above-referenced applications being expressly incorporated by reference herein.

FIELD

The present disclosure relates generally to coating application systems and, more particularly, to an automated system and method of printing images on a surface using a robotic

BACKGROUND

The painting of an aircraft is a relatively challenging and time-consuming process due to the wide range of dimensions, the unique geometry, and the large amount of surface area on an aircraft. For example, the wings protruding from the fuselage can interfere with the painting process. The height of the vertical tail above the horizontal tail can present challenges in accessing the exterior surfaces of the vertical tail. Adding to the time required to paint an aircraft are complex paint schemes that may be associated with an aircraft livery. In this regard, the standard livery of an airline may include images or designs with complex geometric shapes and color combinations and may include the name and logo of the airline which may be applied to different locations of the aircraft such as the fuselage, the vertical tail, and the engine nacelles.

Conventional methods of painting an aircraft require multiple steps of masking, painting, and demasking. For applying an aircraft livery with multiple colors, it may be necessary to perform the steps of masking, painting, and demasking for each color in the livery and which may add to the overall amount of time required to paint the aircraft. In addition, the aircraft livery must be applied in a precise manner to avoid gaps that may otherwise expose a typically-white undercoat which may detract from the overall appearance of the aircraft. Furthermore, the process of applying paint to the aircraft surfaces must be carried out with a high level of control to ensure an acceptable level of coating thickness to meet performance (e.g., weight) requirements.

As can be seen, there exists a need in the art for a system and method for painting an aircraft including applying complex and/or multi-colored images in a precise, cost-effective, and timely manner.

SUMMARY

The above-noted needs associated with aircraft painting are specifically addressed and alleviated by the present disclosure which provides a system for printing an image on a surface using a robot having at least one arm. A printhead may be mounted to the arm and may be movable by the arm over a surface along a rastering path while printing an image slice on the surface. The image slice may have opposing side edges. The printhead may be configured to print the image slice with an image gradient band along at least one of opposing side edges wherein an image intensity within the image gradient band decreases from an inner portion of the image gradient band toward the side edge.

Also disclosed is a system for printing an image comprising a robot having at least one arm and a printhead mounted to the arm. The printhead may be movable by the arm over a surface along a rastering path while printing a new image slice on the surface. The system may include a reference line printing mechanism configured to print a reference line on the surface when printing the new image slice. The system may include a reference line sensor configured to sense the reference line of an existing image slice and transmit a signal (e.g., a path-following-error signal) to the robot causing the arm to adjust the printhead such that a side edge of the new image slice is aligned with the side edge of the existing image slice.

In addition, disclosed is a method of printing an image on a surface. The method may include positioning an arm of a robot adjacent to a surface. The arm may have a printhead mounted to the arm. The method may further include moving, using the arm, the printhead over the surface along a rastering path while printing an image slice on the surface. In addition, the method may include printing an image gradient band along at least one side edge of the image slice when printing the image slice. The image gradient band may have an image intensity that decreases along a direction toward the side edge.

A further method of printing an image on a surface may include printing, using a printhead mounted to an arm of a robot, a new image slice on the surface while moving the printhead over the surface along a rastering path. The method may additionally include printing a reference line on the surface when printing the new image slice. The method may also include sensing, using a reference line sensor, the reference line of an existing image slice while printing the new image slice. Furthermore, the method may include adjusting the lateral position of the new image slice based on a sensed position of the reference line in a manner aligning a side edge of the new image slice with the side edge of the existing image slice.

In a further example, the system for printing the image includes a robot, a printhead, a laser device, and a reference line sensor. The robot has at least one arm. The printhead is mounted to the arm and is movable by the arm over a surface along a rastering path while printing a new image slice over the surface. The laser device is configured to etch, during printing of the new image slice, a reference line into either the new image slice or, more preferably, into the basecoat at a location adjacent to the new image slice. The reference line sensor is configured to sense the reference line of an existing image slice and transmit to the robot a signal (e.g., a path-following-error signal) representing the magnitude of the error in the position of the printhead relative to the reference line. The system may include a position servo loop for continuously adjusting the printhead in a manner such that a side edge of the new image slice is maintained in alignment with the side edge of the existing image slice.

In another example, the system includes a high-bandwidth actuator coupling an inkjet printhead to an end of the arm of the robot. The inkjet printhead is movable by the arm over a surface along a rastering path while printing a new image slice over the surface. The laser device is configured to etch, during printing of the new image slice, a reference line into either the new image slice or into a basecoat at a location adjacent to the new image slice. The system further includes a camera configured to sense the reference line of an existing image slice and transmit a signal (e.g., a path-following-error signal) to the robot resulting in a correction command to the high-bandwidth actuator to adjust the inkjet printhead in a manner such that the side edge of the new image slice is maintained in alignment with the side edge of the existing image slice.

Also disclosed is a method of printing an image on a surface. The method includes printing, using a printhead mounted to an arm of a robot, a new image slice on the surface while moving the printhead over the surface along a rastering path. The method additionally includes etching, using a laser device, a reference line into either the new image slice or into a basecoat while printing the new image slice. The method further includes sensing, using a reference line sensor, the reference line of an existing image slice while printing the new image slice. Additionally, the method includes adjusting, using a controller, the printhead based on a sensed position of the reference line in a manner maintaining alignment of a side edge of the new image slice with the side edge of the existing image slice.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
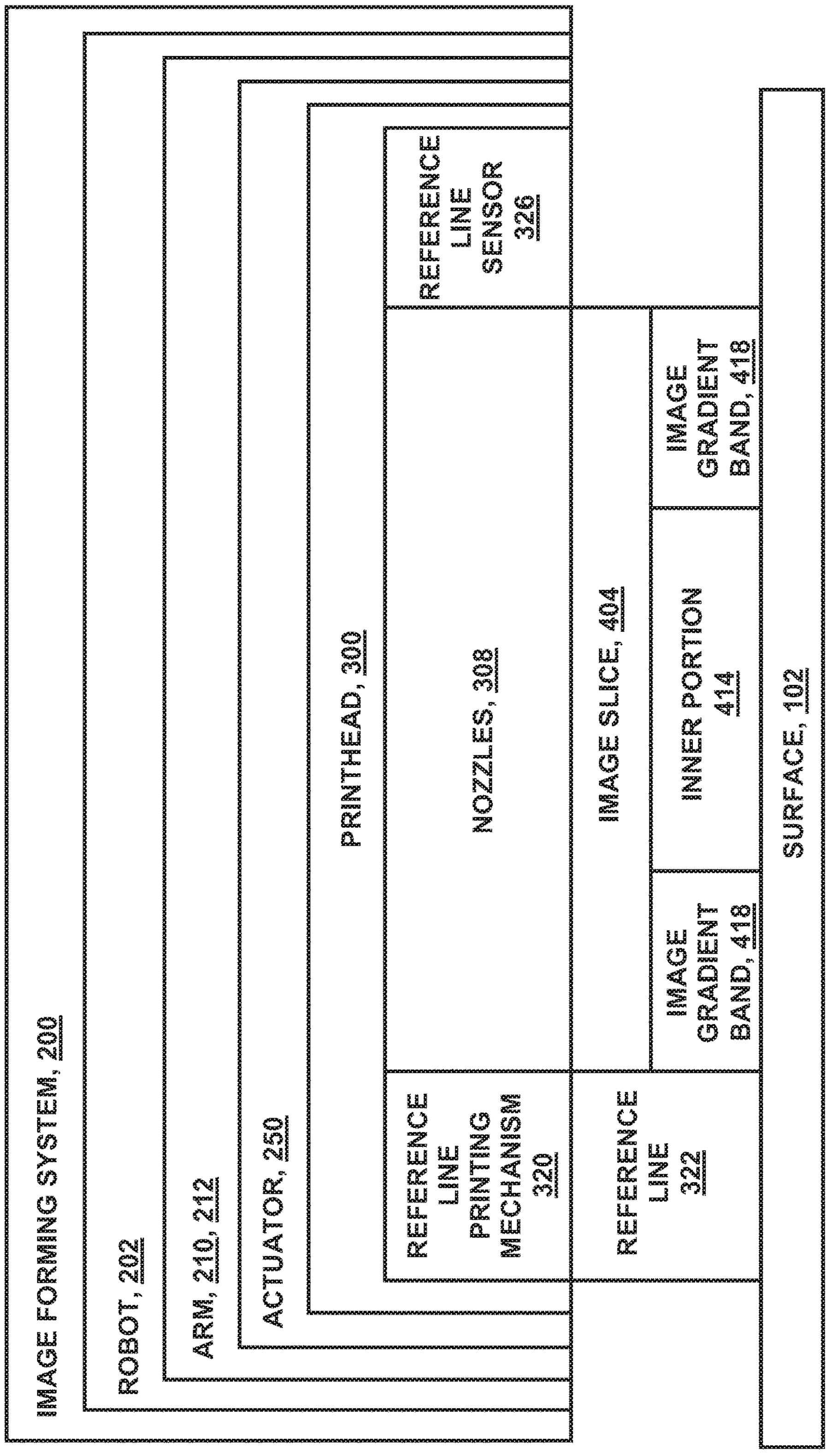
FIG. 1 is a block diagram of an example of an image forming system.

Referring now to the drawings wherein the showings are for purposes of illustrating various embodiments of the present disclosure, shown in FIG. 1 is a block diagram of an example of an image forming system 200 as may be implemented for robotically (e.g., automatically or semi-automatically) printing an image 400 (e.g., FIGS. 2, 3, 6, 23) on a surface 102. The system 200 includes a robot 202 (a robotic mechanism) and/or at least one arm (e.g., a first and second arm 210, 212). The printhead 300 may be mounted on an arm (e.g., the second arm 212). In some examples, the system 200 may include one or more high-bandwidth actuators 250 (e.g., FIGS. 17-20) coupling the printhead 300 to the end 214 (FIG. 5) of the arm. As described below, such high-bandwidth actuators 250 may provide precise and rapid control over the position and orientation of the printhead 300 during printing of an image slice 404.

The printhead 300 may be configured as an inkjet printhead having a plurality of nozzles 308 (e.g., FIGS. 8-10, 14-15, 25-27, and 29) or orifices for ejecting droplets 330 (FIGS. 9-10) of ink, paint, or other fluids or colorants onto a surface 102 to form an image 400. The inkjet printhead 300 may be configured as a thermal inkjet printer, a piezoelectric printer, or a continuous printer. However, the printhead 300 may be provided in other configurations such as a dot matrix printer or other printer configurations capable of printing an image 400 on a surface 102.

The image forming system 200 prints image slices 404 on a surface 102 along a series of parallel rastering paths 350 (e.g., FIGS. 7, 13, 24, 28). The parallel image slices 404 may collectively form an image 400. In one example, the printhead 300 may print an image slice 404 in overlapping relation to an adjacent image slice 404. In this regard, the printhead 300 may be configured to print an image slice 404 with an image gradient band 418 along at least one side edge 416 (FIG. 6) of the image slice 404. The image gradient band 418 of one image slice 404 may overlap the image gradient band 418 of an adjacent image slice 404. The image intensity within an image gradient band 418 may decrease along the direction transverse to the direction of the rastering path 350. By overlapping the image gradient bands 418 of adjacent image slices 404, gaps in the image 400 may be prevented. In the present disclosure, the image intensity within overlapping image gradient bands 418 may result in a substantially uniform image gradient across the width of an image 400 such that the overlaps may be visually imperceptible. In one example, the image intensity within the overlapping image gradient bands 418 may be substantially equivalent to the image intensity within an inner portion 414 of each image slice 404.

In another example of the image forming system 200, the printhead 300 may include a reference line printing mechanism 320 that may print (e.g., FIGS. 13-16) or etch (e.g., FIGS. 23-30) a reference line 322 during the printing of an image slice 404. For example, a reference line 322 may be printed (FIGS. 13-16) or etched (FIGS. 23-30) along a side edge 416 of an image slice 404. The printhead 300 may include a reference line sensor 326 configured to detect and/or sense the reference line 322 of an existing image slice 408 and transmit a path-following-error signal to the robot 202 causing the robot arm (FIG. 5) and/or high-bandwidth actuators 250 (see FIGS. 17-20) to correct or adjust the printhead 300 (e.g., in real time) such that the side edge 416 of the new image slice 406 is maintained in alignment with the side edge 416 of the existing image slice 408 during the printing of the new image slice 406. In this manner, the reference line 322 may allow the printhead 300 to precisely follow the rastering path 350 of a previously-printed image slice 404 such that the side edges 416 of the new and existing image slices 406, 408 (FIG. 7) are aligned in non-gapping and/or non-overlapping relation to one another, and thereby avoiding gaps between adjacent image slices 404 which may otherwise detract from the quality of the image 400.

Figure 2:
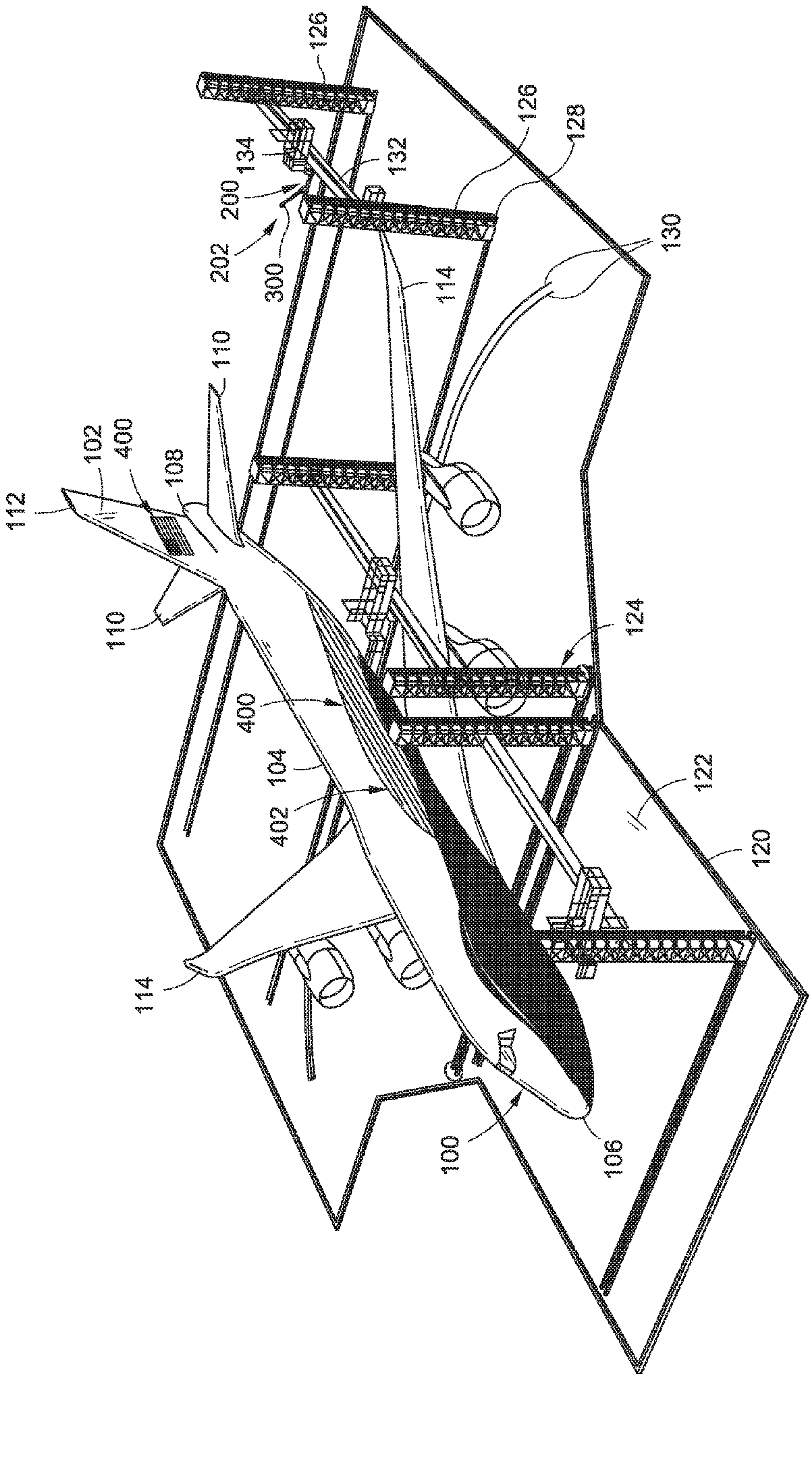
FIG. 2 is perspective view of an aircraft surrounded by a plurality of gantries supporting one or more image forming systems for printing one or more images on the aircraft.

FIG. 2 is perspective view of an aircraft 100 and a gantry system which may be implemented for supporting one or more image forming systems 200 as disclosed herein. The aircraft 100 may have a fuselage 104 having a nose 106 at a forward end and an empennage 108 at an aft end of the fuselage 104. The top of the fuselage 104 may be described as the crown, and the bottom of the fuselage 104 may be described as the keel. The aircraft 100 may include a pair of wings 114 extending outwardly from the fuselage 104. One or more propulsion units may be mounted to the aircraft 100 such as to the wings 114. The empennage 108 may include a horizontal tail 110 and a vertical tail 112.

In FIG. 2, the gantry system may be housed within a hangar 120 and may include a plurality of gantries 124 positioned on one or more sides on the aircraft 100. Each one of the gantries 124 may include a pair of vertical towers 126 that may be movable via a motorized base 128 along a floor track system 130 that may be coupled to or integrated into a floor 122. Each gantry 124 may include a crossbeam 132 extending between the towers 126. The crossbeam 132 of each gantry 124 may include a personnel platform 134. In addition, the crossbeam 132 may support at least one robot 202 that may be movable along the crossbeam 132. Advantageously, the gantry system may provide a means for positioning the robot 202 such that the printhead 300 has access to the crown, the keel, and other exterior surfaces 102 of the aircraft 100 including the sides of the fuselage 104, the vertical tail 112, the propulsion units, and other surfaces 102.

Although the system 200 and method of the present disclosure is described in the context of printing images on an aircraft 100, the system 200 and method may be implemented for printing images on any type of surface, with out limitation. In this regard, the surface 102 may be a surface of a motor vehicle including a tractor-trailer, a building, a banner, or any other type of movable or non-movable structure, object, article, or material having a surface to be printed. The surface may be planar, simply curved, and/or complexly curved.

Figure 3:
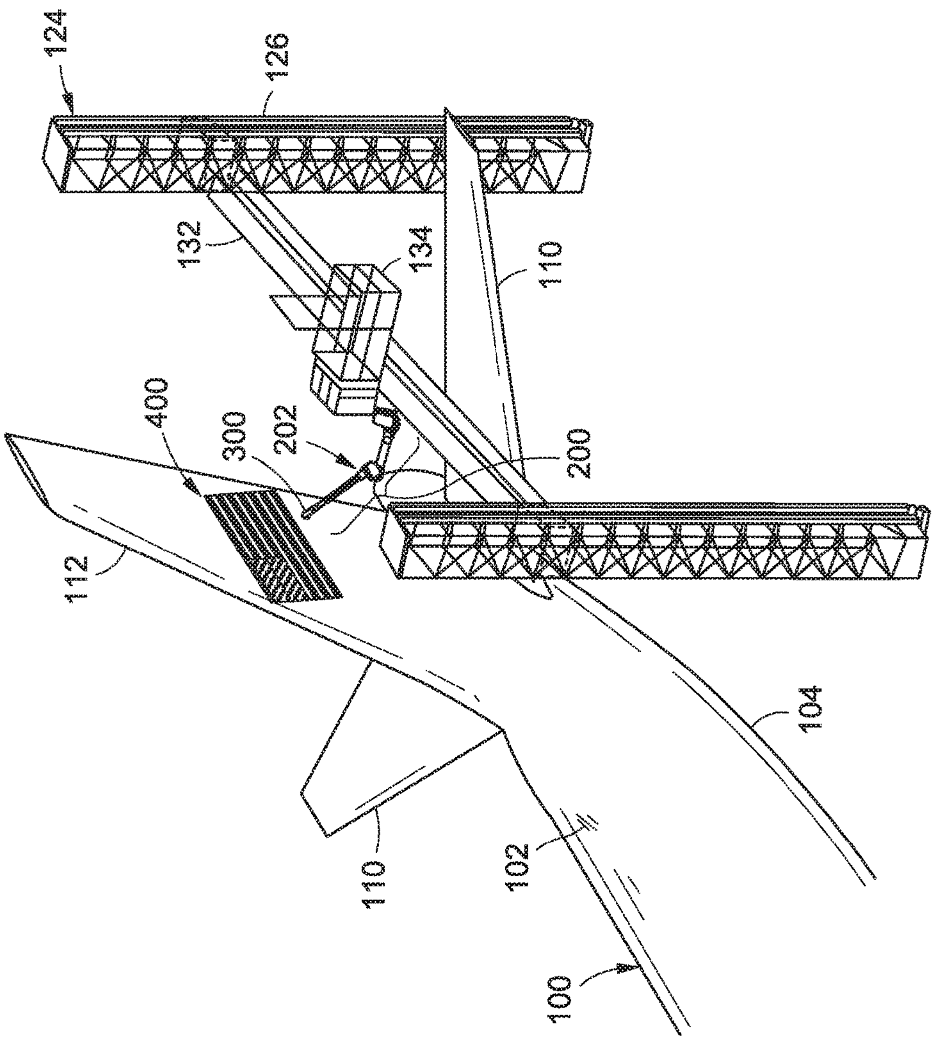
FIG. 3 is a perspective view of the aircraft showing one of the gantries positioned adjacent to a vertical tail and supporting an image forming system for printing an image on the vertical tail.
Figure 23:
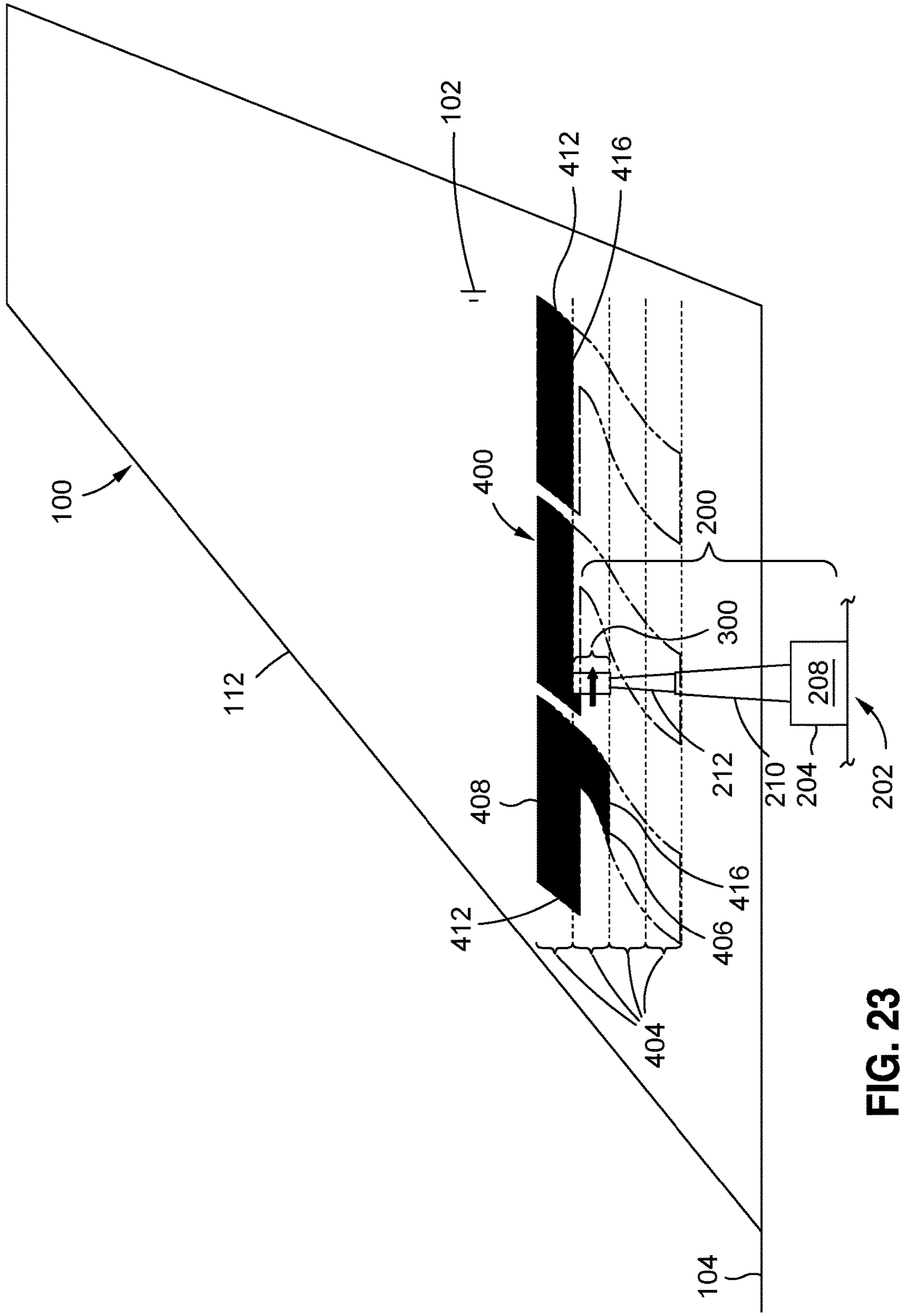
FIG. 23 is a further example of an image forming system in which the printhead includes one or more laser devices for etching a reference line into a basecoat or into a new image slice while printing each new image slice.

FIG. 3 shows a gantry 124 positioned adjacent to the vertical tail 112. A robot 202 mounted to the crossbeam may support an image forming system 200 for printing an image 400 on the vertical tail 112. In FIG. 3, the image 400 is shown as a flag which may be printed on the vertical tail 112 such as by using ink from an inkjet printhead 300. In FIG. 23, the image is shown as a model designation printed on a vertical tail 112 using an inkjet printhead 300. However, the printhead 300 may be configured to apply images using other fluids including, but not limited to paint, pigment, and/or other colorants and/or fluids. In addition, the image forming system 200 disclosed herein is not limited to forming graphic images.

In the present disclosure, the term "image" includes any type of coating that may be applied to a surface 102 (FIG. 2). An image may have a geometric design, any number of color(s) including a single color, and/or may be applied in any type of coating composition(s). In one example, the image 400 may include a graphic design, a logo, lettering, numbers, symbols, and/or any other types of indicia. In this regard, an image 400 may include an aircraft livery 402 which may comprise a geometric design or pattern that may be applied to the exterior surfaces 102 of an aircraft 100, as described above. The image 400 may include a reproduction of a photograph. Even further, an image 400 may be a monotone coating of paint, ink, or other colorant or fluid, and is not limited to a graphic design, logo, or lettering or other indicia.

Figure 4:
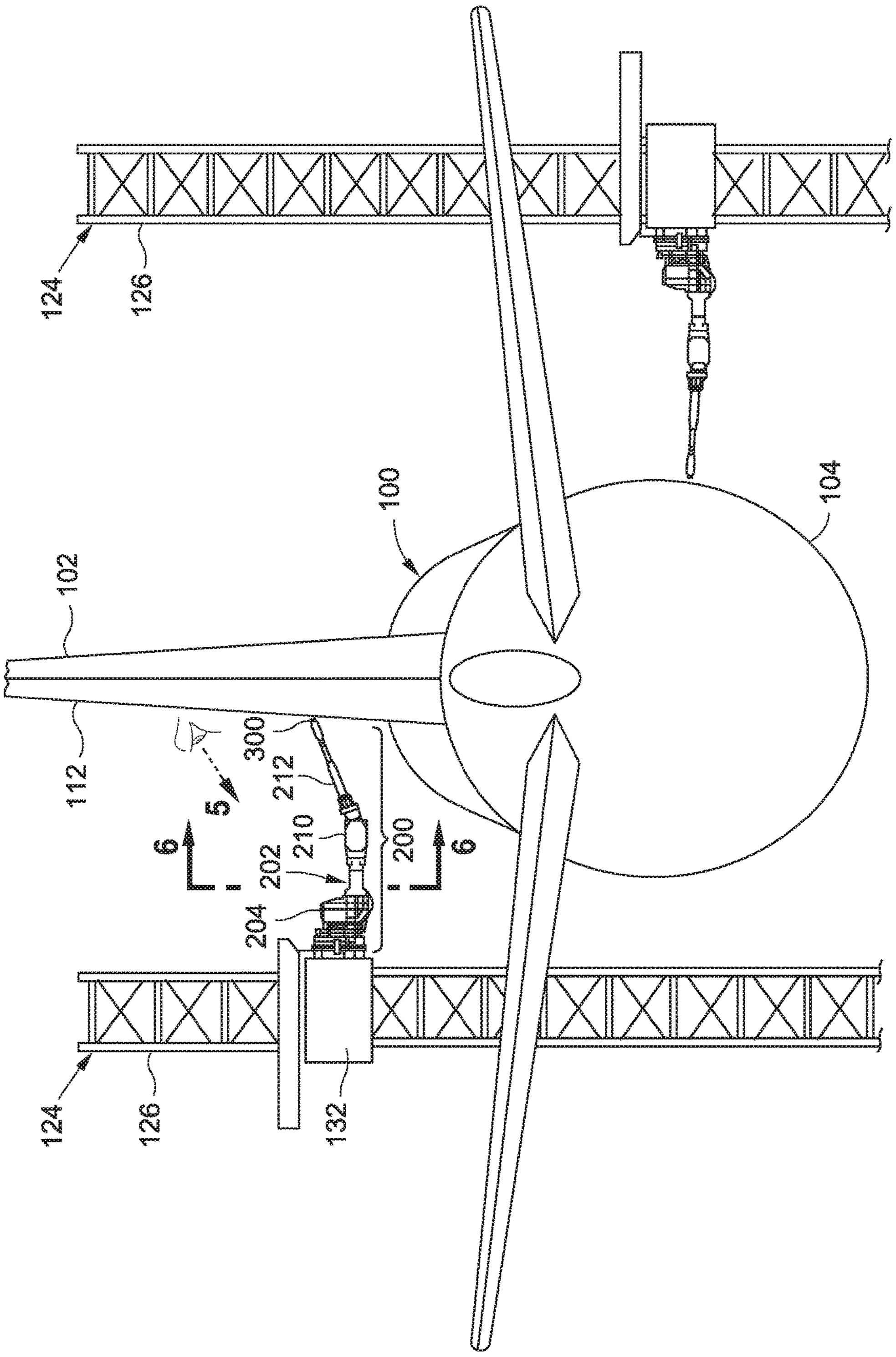
FIG. 4 is an end view of the aircraft showing image forming systems positioned on opposite sides of the aircraft.

FIG. 4 is an end view of an aircraft 100 showing image forming systems 200 positioned on opposite sides of the aircraft 100. Each image forming system 200 may include a robot 202 having one or more arms and a printhead 300 coupled to a terminal end 214 (FIG. 4) of the arm of the robot 202. One of the image forming systems 200 is shown printing an image 400 (e.g., a flag) on a vertical tail 112. The other image forming system 200 is shown printing an image 400 such as the geometric design of an aircraft livery 402 (e.g., see FIG. 2) on a side of fuselage 104.

Although the robot 202 of the image forming system 200 is described as being mounted on a gantry 124 supported on a crossbeam 132 suspended between a pair of towers 126 (FIGS. 1-5), the robot 202 may be supported in any manner, without limitation. For example, the robot 202 may be suspended from an overhead gantry 124 (not shown). Alternatively, the robot 202 may be mounted on another type of movable platform. Even further, the robot 202 may be non-movably or fixedly supported on a shop floor (not shown) or other permanent feature.

Figure 5:
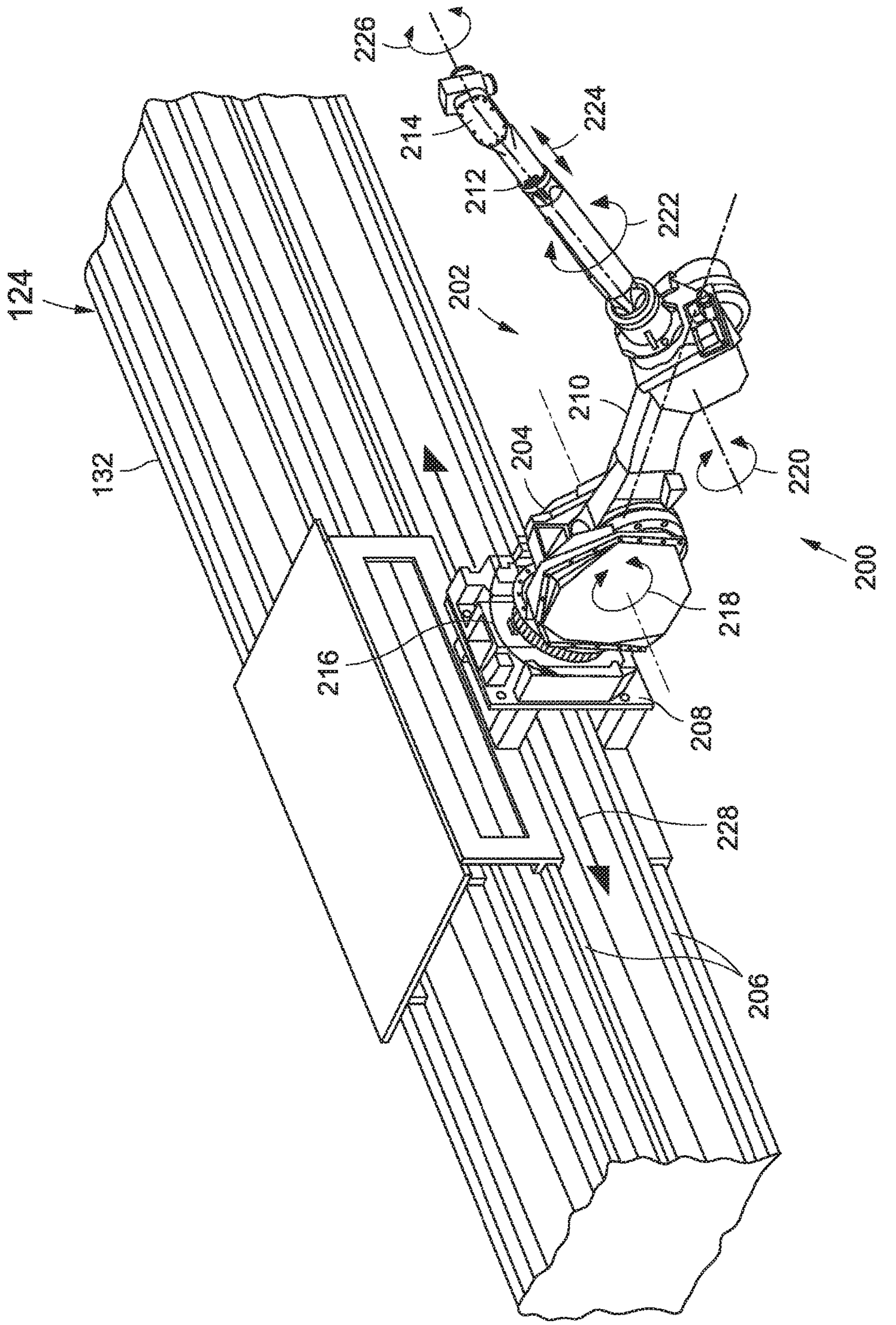
FIG. 5 is a perspective view of a robot taken along line 5 of FIG. 4 and illustrating the robot mounted to a crossbeam of a gantry and having a printhead mounted on an arm of the robot.

FIG. 5 is a perspective view of a robot 202 mounted to a crossbeam 132 of a gantry 124 and having a printhead 300 mounted on an arm of the robot 202. The robot 202 may be movable along guide rails 206 extending along a lengthwise direction of the crossbeam 132. In the example shown, the robot 202 may include a robot base 204, a first arm 210, and a second arm 212, with the printhead 300 mounted on the end 214 of the second arm 212. The robot base 204 may allow for rotation of the robot base 204 about a first axis 216 relative to the crossbeam 132. The first arm 210 may be rotatable about a second axis 218 defined by a joint coupling the first arm 210 to the robot base 204. The second arm 212 may be rotatable about a third axis 220 defined by a joint coupling the second arm 212 to the first arm 210. In addition, the second arm 212 may be swivelable about a fourth axis 222 extending along a length of the second arm 212. The length of the second arm 212 may be extendable and retractable to define a fifth axis 224 of movement.

In FIGS. 4 and 5 the printhead 300 is shown being rotatable about a sixth axis 226 defined by a joint coupling the printhead 300 to the second arm 212. The robot base 204 may include a robot drive system (not shown) for propelling the robot base 204 along the length of the crossbeam 132 and defining a seventh axis 228 of movement of the robot 202. The robot 202 may include a controller 208 for controlling the operation of the base 204, the arms, and/or the printhead 300. Although shown as having a first arm 210 and a second arm 212, the robot 202 may include any number of arms and joints for movement about or along any number of axes to allow the printhead 300 to reach any one of a variety of different locations and orientation relative to a surface 102. In some examples, the robot 202 may be devoid of a base 204 and/or the robot may comprise a single arm to which the printhead 300 may be directly or indirectly coupled.

Figure 6:
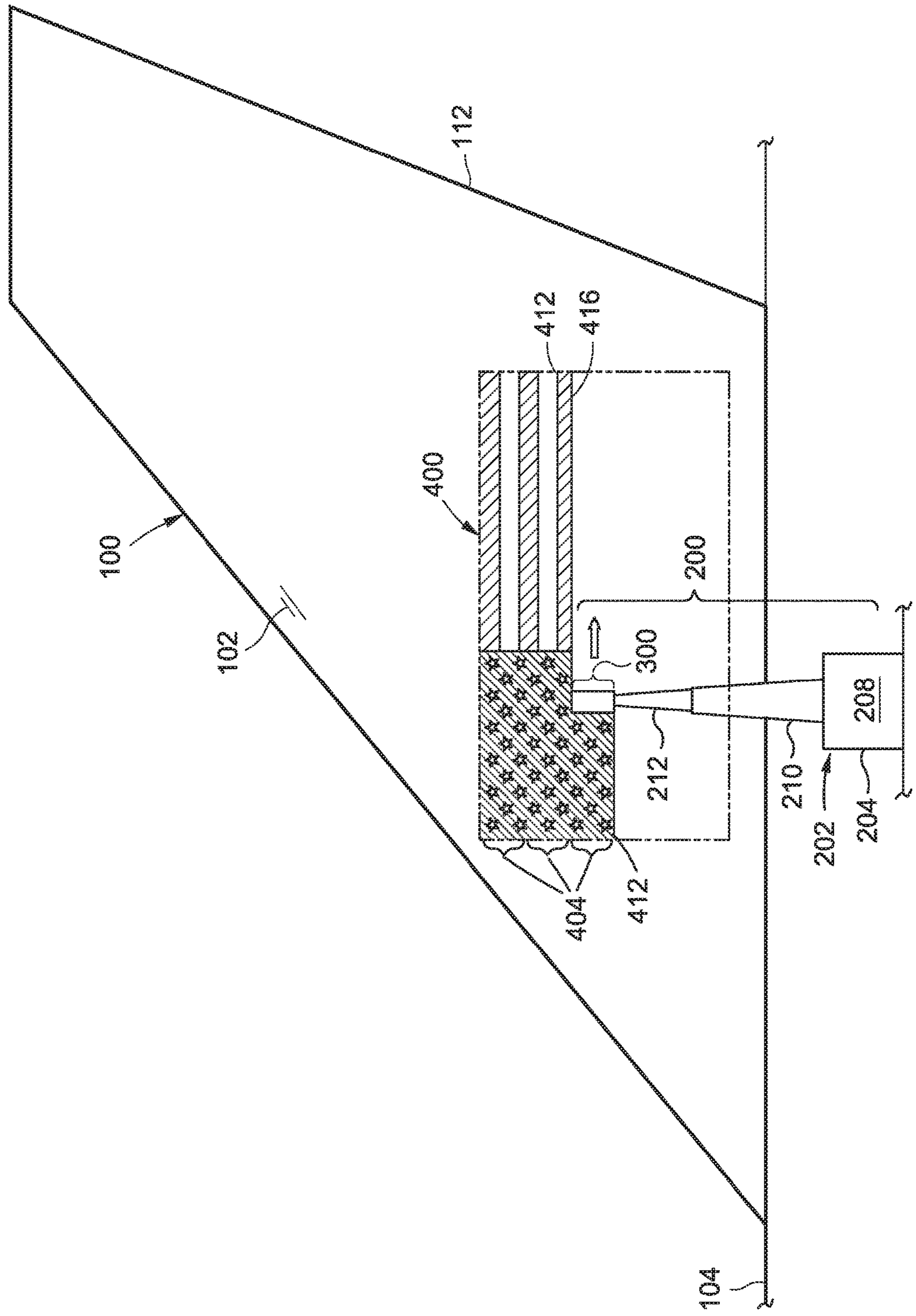
FIG. 6 is a side view of the image forming system taken along line 6 of FIG. 4 and illustrating the printhead printing an image on the vertical tail.

FIG. 6 is a side view of the image forming system 200 printing an image 400 on the vertical tail 112. The first arm 210 and second arm 212 may be movable relative to the base 204 of the robot 202 to position the printhead 300. The printhead 300 is movable by the arms over the surface 102 along one or more rastering paths 350 to print an image slice 404 on the surface 102. In any one of the image printing systems 200 disclosed herein, the printhead 300 may be moved along parallel rastering paths 350 to form parallel images slices 404 that collectively define the image 400. The robot 202 may be configured to maintain the orientation of the printhead face 304 parallel to the local position on the surface 102 as the printhead 300 is moved over the surface 102.

Figure 7:
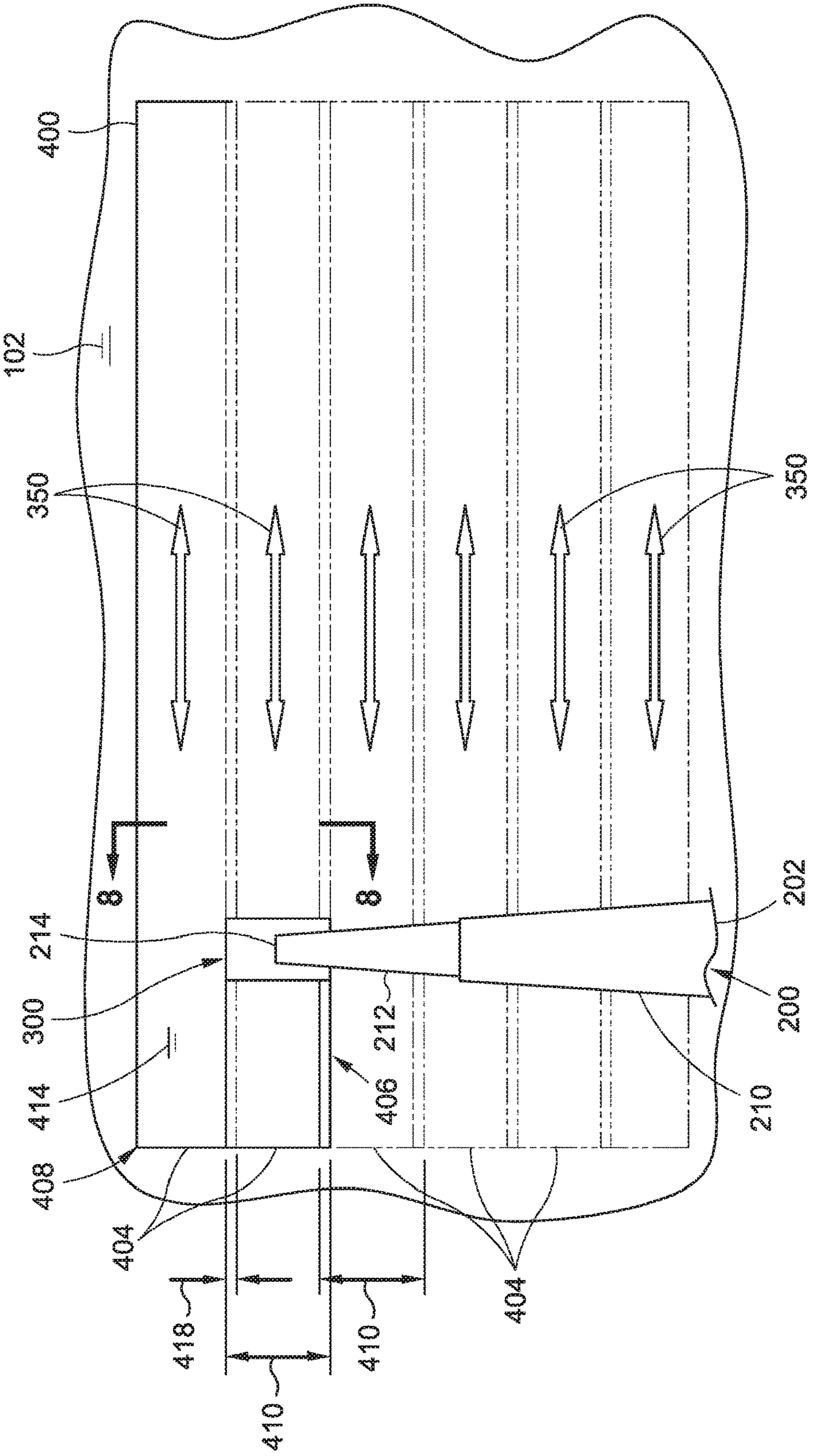
FIG. 7 is a plan view of an example of a printhead being moved along a rastering path to form an image slice having an image gradient band overlapping the image gradient band of an adjacent image slice.

FIG. 7 shows an example of a printhead 300 being moved along a rastering path 350 to form an image slice 404. Each one of the rastering paths 350 is shown as being straight when viewed from above along a direction normal to the surface 102. However, in any one of the image printing systems 200 disclosed herein, the printhead 300 may be moved along a rastering path 350 that is curved or a combination of curved and straight. The printhead 300 may sequentially print a plurality of parallel image slices 404 side-by-side to collectively form an image 400 on the surface 102.

Figures 8, 9, 10:
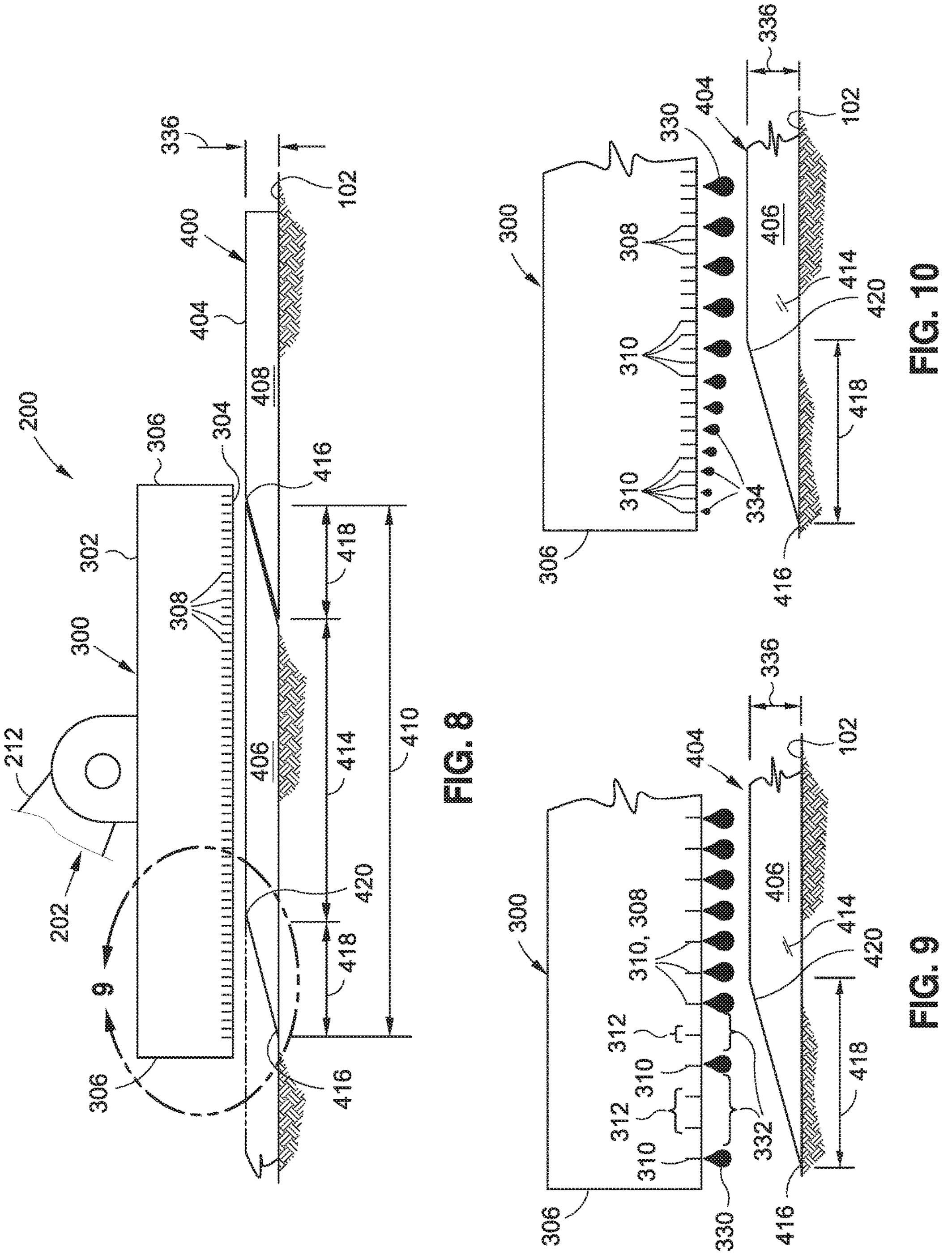
FIG. 8 is a sectional view of a printhead taken along line 8 of FIG. 7 and illustrating overlapping image gradient bands of the image slices printed by the printhead.
FIG. 9 is a magnified view of a portion of a printhead taken along line 9 of FIG. 8 and showing progressively increasing droplet spacings as may be ejected by active nozzles to form an image gradient band.
FIG. 10 is a magnified view of a portion of a printhead showing progressively decreasing droplet sizes as may be ejected by the nozzles to form an image gradient band.

FIG. 8 is a sectional view of a printhead 300 printing image slices 404 on a surface 102. The printhead width 302 may be oriented parallel to a transverse direction 354 (FIG. 13) to the rastering path 350. The printhead 300 may include a plurality of nozzles 308 or orifices distributed between opposing widthwise ends 306 of the printhead 300. For example, an inkjet printhead may include thousands of orifices. The printhead 300 may eject droplets 330 (FIG. 10) of ink, paint, or other fluids from the orifices to form a coating having a coating thickness 336 on the surface 102.

Each image slice 404 (FIG. 8) may have opposing side edges 416 defining a bandwidth 410 of the image slice 404. The printhead 300 may be configured to print an image slice 404 with an image gradient band 418 along at least one of the side edges 416. In the example shown, an image slice 404 may contain an inner portion 414 bounded on opposite sides by an image gradient band 418. An image gradient band 418 may be described as a band within which the intensity of the color of the image slice 404 changes (e.g., decreases) along a transverse direction 354 relative to the direction of the rastering path 350 from an inner boundary 420 of the image gradient band 418 to the side edge 416. For example, the inner portion 414 of the image slice 404 may be black in color. Within the image gradient band, the color may gradually change from black at the inner boundary 420 (e.g., a relatively high intensity) to white (e.g., a relatively low intensity) at the side edge 416 of the image slice 404. An image gradient band 418 of an image slice 404 may be wider than the inner portion 414 of the image slice 404. For example, an image gradient band 418 may be no more than 30% the bandwidth 410 of the image slice 404.

In the example of FIGS. 8-12, the printhead 300 may be moved along the rastering paths 350 such that the image gradient bands 418 of the image slices 404 overlap. Advantageously, the overlapping rastering paths 350 allow for gaps and overlaps representing deviations from the nominal spacing between adjacent image slices 404 resulting in a reduced likelihood that such deviations from the nominal image slice spacing are visually perceptible. In this regard, the image gradient bands 418 on the side edges 416 of the adjacent image slices 404, when superimposed, result in imperceptible image edges even with imperfect tracking by the robot 202 along the rastering paths 350. In this manner, the image gradient bands 418 allow for printing of complex, intricate, and multi-colored images in multiple, single-pass image slices 404 on large-scale surfaces 102 using large-scale rastering devices such as the robot 202 shown in FIGS. 1-5.

FIG. 9 is a magnified view of a printhead 300 showing one example for forming an image gradient band 418. As indicated above, the decrease in the intensity of the image gradient band 418 may be achieved by reducing or tapering the coating thickness 336 along a transverse direction 354 (FIG. 13) from the inner boundary 420 of the image gradient band 418 to the side edge 416 of the image slice 404. The droplet spacing 332 may be uniform within the inner portion 414 of the image slice 404. In FIG. 9, the coating thickness 336 within the image gradient band 418 may be tapered by progressively increasing the droplet spacing 332 between the droplets 330 ejected by the nozzles 308. In this regard, some of the nozzles 308 (e.g., orifices) of the printhead 300 in the area wherein the image gradient band 418 is to be printed may be electronically deactivated and may be referred to as inactive nozzles 312, and only active nozzles 310 within the image gradient band 418 may eject droplets 330 to form the image gradient band 418. In other examples, the printhead 300 may be provided with progressively larger gaps between nozzles 308 for the area wherein the image gradient band 418 is to be printed.

FIG. 10 is a magnified view showing another example of a printhead 300 forming an image gradient band 418 by maintaining the nozzles 308 as active nozzles 310 producing a uniform droplet spacing, and progressively decreasing the droplet size 334 in the area where the image gradient band 418 is to be formed. In still further examples, an image gradient band 418 may be formed by a combination of controlling the droplet spacing 332 and controlling the droplet size 334. However, other techniques may be implemented for forming image gradient bands 418 and are not limited to the examples shown in the figures and described above. The printhead 300 may be configured to form the image gradient band 418 with an image gradient that is linearly decreasing. Alternatively, the image gradient within the image gradient band 418 may be non-linear.

Figure 11:
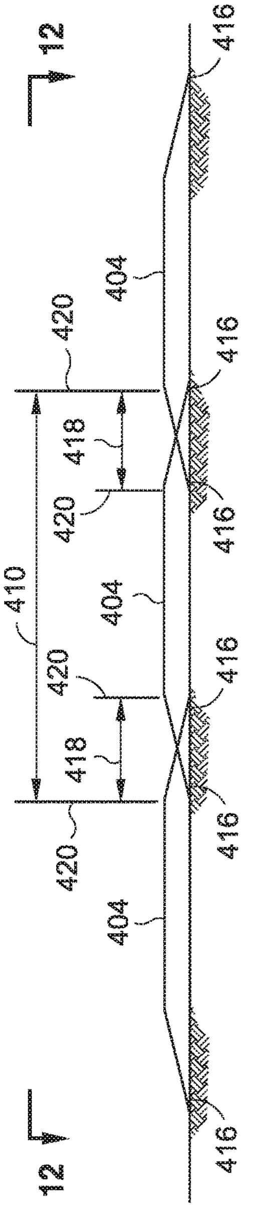
FIG. 11 is a diagrammatic sectional view of adjacent image slices with overlapping image gradient bands.
Figure 12:
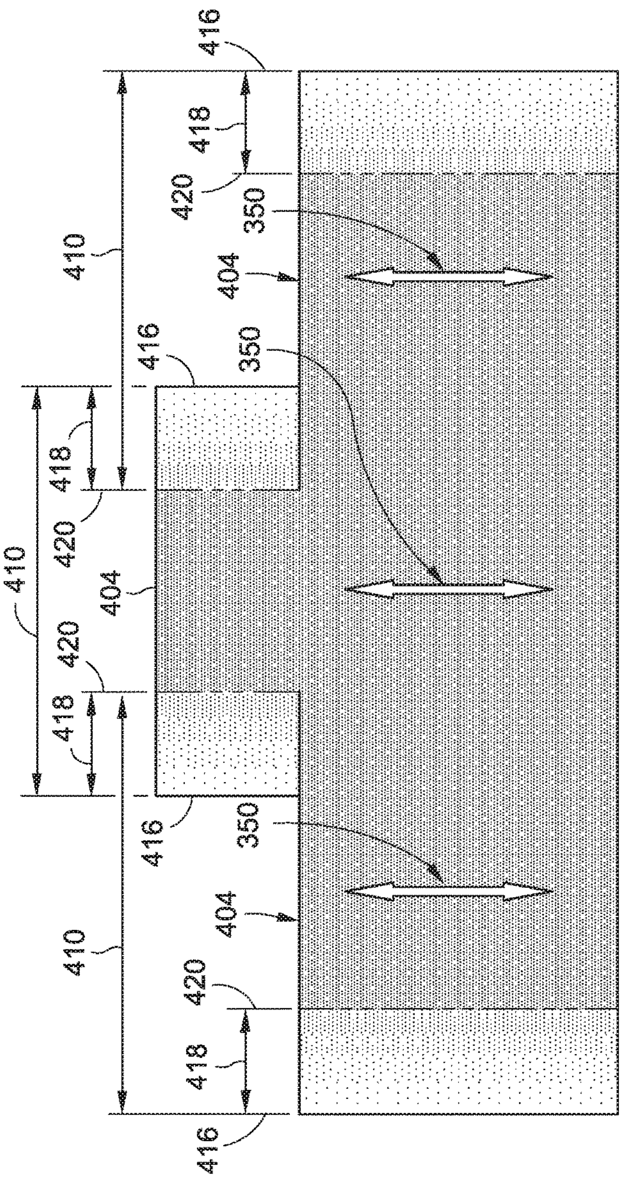
FIG. 12 is a plan view of the adjacent image slices of FIG. 11 showing the overlapping image gradient bands.

FIG. 11 is a diagrammatic sectional view of adjacent image slices 404 with overlapping image gradient bands 418. Shown is the coating thickness 336 (FIG. 10) in the image gradient band 418 and in the inner portion 414 of each image slice 404. FIG. 12 is a plan view of the image slices 404 of FIG. 11 showing the overlapping image gradient bands 418 and the parallel rastering paths 350 of the image slices 404. In the system 200 as shown, the arm (FIG. 7) may move the printhead 300 to print a new image slice 406 in parallel relation to an existing image slice 408 (e.g., a previously-printed image slice 404) in a manner such that an image gradient band 418 of the new image slice 406 (FIG. 8) overlaps an image gradient band 418 of the existing image slice 408. In this regard, the side edge 416 of each image slice 404 may be aligned with an inner boundary 420 of an overlapping or overlapped image gradient band 418. However, in an example not shown, the printhead 300 may print image slices 404 in a manner to form a gap between the side edge 416 of an image gradient band 418 of a new image slice 406 and an existing image slice 408. As indicated above, the printhead 300 may print the image gradient band 418 of the new image slice 406 and the existing image slice 408 such that the overlap has an image intensity equivalent to the image intensity of the inner portion 414 of the new image slice 406 and/or the existing image slice 408.

In a still further example not shown, the printhead 300 (FIG. 10) may form an image gradient end on at least one of opposing ends of an image slice 404. An image gradient end may have an image intensity that may decrease toward an end edge (not shown) of the image slice 404. Such an image gradient end may provide a means for blending (e.g., feathering) the image slice 404 with the color and design of the existing color and design of the surface 102 area surrounding the newly-applied image 400. For example, the system may apply a newly-applied image 400 to a portion of a surface that may have undergone reworking such as the removal and/or replacement of a portion of a composite skin panel (not shown) and/or underlying structure. The image gradient ends of the newly-applied image slices 404 may provide a means for blending into the surrounding surface 102. The image gradient end may also facilitate the blending on a new image slice 406 with the image gradient end of another image 400 located at an end of a rastering path 350 of the new image slice 406.

Figure 13:
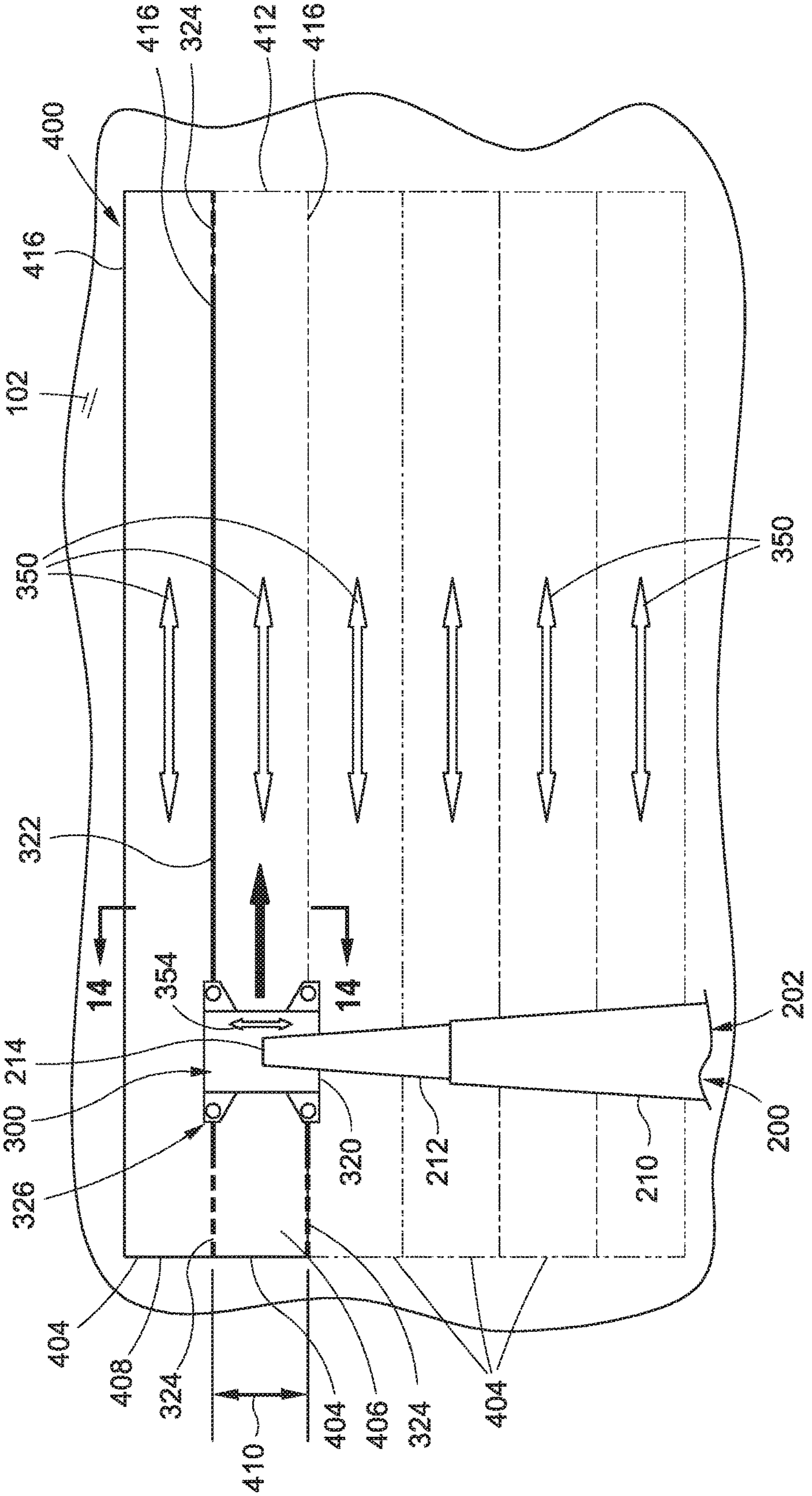
FIG. 13 is an example of a printhead printing a reference line while printing a new image slice.

Referring to FIG. 13, shown is an example of a printhead 300 mounted on an end 214 of a robot arm and being movable by the arm over a surface 102 along a rastering path 350 while printing a new image slice 406 adjacent to an existing image slice 408. The printhead 300 includes a reference line printing mechanism 320 configured to print a reference line 322 when printing the new image slice 406. The reference line 322 provides a means for the printhead 300 to precisely track the rastering path 350 of an existing image slice 408. The printhead 300 includes at least one reference line sensor 326 such as an image detection system for sensing the reference line 322 and providing path error feedback to the controller 208 (FIG. 14) to allow the robot 202 to generate path correction inputs to the printhead 300 such that the side edge 416 of the new image slice 406 is maintained in alignment with the side edge 416 of the existing image slice 408.

Figure 14:
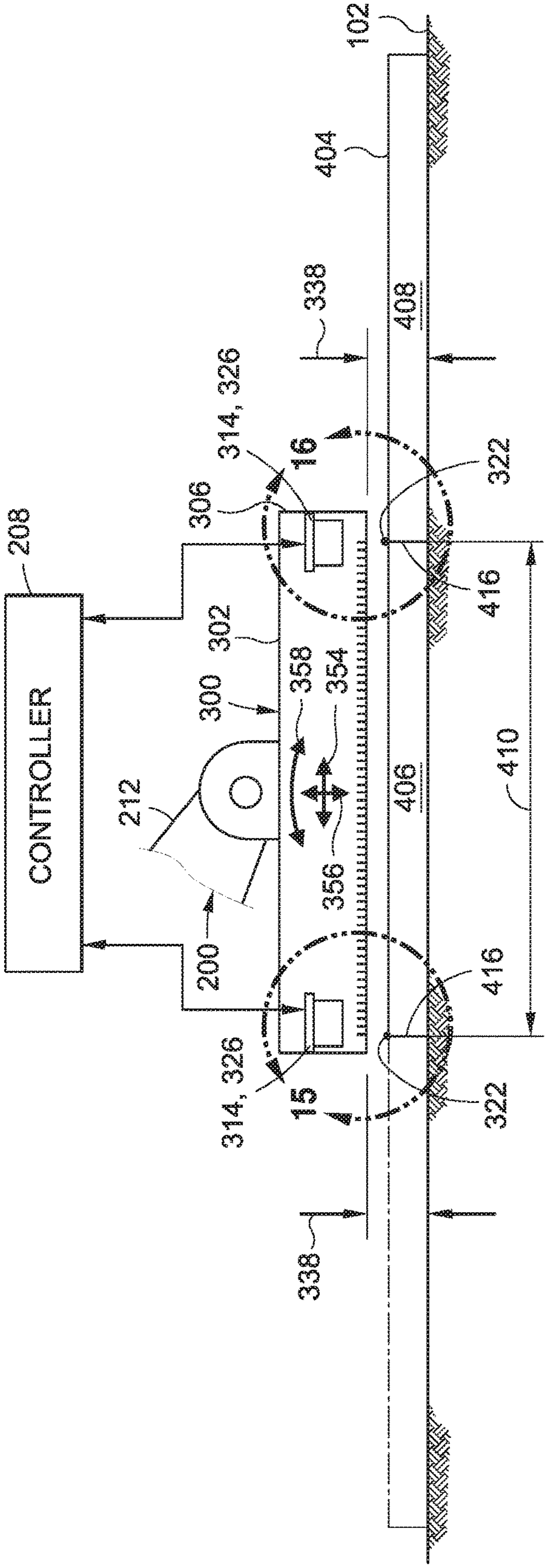
FIG. 14 is a sectional view taken along line 14 of FIG. 13 and illustrating a printhead including a reference line printing mechanism and one or more reference line sensors for sensing the reference line of an existing image slice.

FIG. 14 shows an example of a printhead 300 printing an image slice 404 adjacent to an existing image slice 408. The existing image slice 408 may include a reference line 322 along one of the side edges 416. The printhead 300 may have one or more reference line sensors 326 mounted on each one of the widthwise ends 306 of the printhead 300. One or more of the reference line sensors 326 may be configured to sense the reference line 322 of an existing image slice 408. In addition, the printhead 300 may include one or more position sensors 314 for monitoring the position and/or orientation of the printhead 300 relative to the surface 102. In some examples, the reference line sensors 326 may be configured as position sensors 314 to sense the position and/or orientation of the printhead 300 in addition to sensing the reference line 322.

The position sensors 314 at one or both of the widthwise ends 306 of the printhead 300 may measure a normal spacing 338 of the printhead 300 from the surface 102 along a direction locally normal to the surface 102. Feedback provided by the position sensors 314 to the controller 208 may allow the controller 208 to adjust the arm position such that the face of the printhead 300 is maintained at a desired normal spacing 338 from the surface 102 such that the droplet may be accurately placed on the surface 102. In further examples, the controller 208 may use continuous or semi-continuous feedback from the position sensors 314 to rotate the printhead 300 as necessary along a roll direction 358 such that the face of the printhead 300 is maintained parallel to the surface 102 as the printhead 300 is moved over the surface 102 which may have a changing and/or curved contour.

Figure 15:
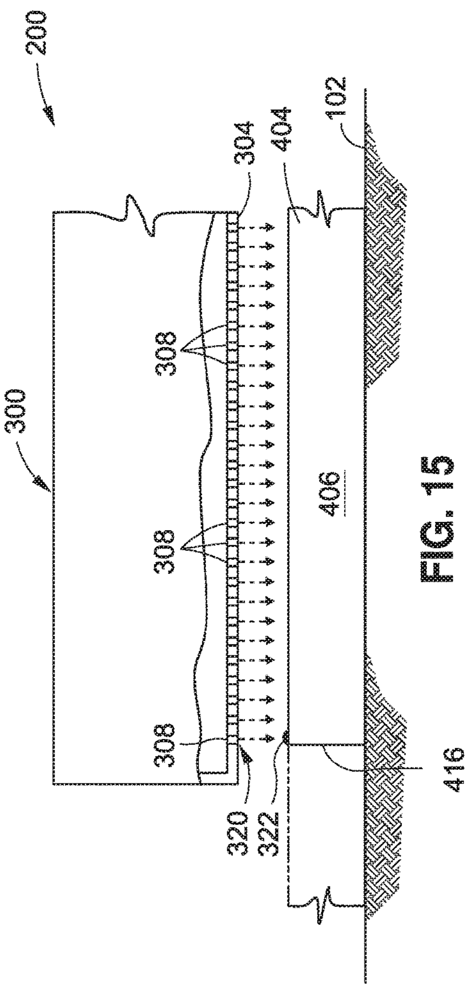
FIG. 15 is a magnified view taken long line 15 of FIG. 14 and showing one of the nozzles of the printhead printing the reference line while the remaining nozzles of the printhead print the image slice.

FIG. 15 shows an example of a printhead 300 wherein the reference line printing mechanism 320 comprises one or more dedicated nozzles 308 configured to print the reference line 322 on at least one of opposing side edges 416 of a new image slice 406. The remaining nozzles 308 of the printhead 300 may be configured to print the image slice 404. In other examples not shown, the reference line printing mechanism 320 may comprise a dedicated line-printing device that may be mounted on the printhead 300 and configured to print a reference line 322 while the nozzles 308 of the printhead 300 print the image slice 404.

The printhead 300 may print the reference line 322 to be visible within a certain spectrum such as the visible spectrum and/or the infrared spectrum. In some examples, the reference line 322 may have a thickness that prevents detection by the human eye beyond a certain distance (e.g., more than 10 feet) from the surface 102. In other examples, the reference line 322 may be printed as a series of spaced dots (e.g., every 0.01 inch) which may be visually imperceptible beyond a certain distance to avoid detracting from the quality of the image. In still other examples, the color of the reference line 322 may be imperceptible relative to the local color of the image 400, or the reference line 322 may be invisible in normal ambient lighting conditions (e.g., shop light or sunlight) and may be fluorescent under a fluorescent light that may be emitted by the reference line sensor 326. Even further, the reference line 322 may be invisible within the visible spectrum, or the reference line 322 may initially be visible under ambient light and may fade over time under ambient conditions such as due to exposure to ultraviolet radiation.

In still further examples, the reference line 322 may be printed with at least one encoding pattern 324 (e.g., see FIG. 13) along at least a portion of the reference line 322. The encoding pattern 324 may comprise a system of line segments 323 separated by gaps 321. The encoding pattern 324 may represent information about the image slice 404. For example, the encoding pattern 324 may represent information regarding the distance from the current location (e.g., the location where the encoding pattern 324 is currently detected) of the printhead 300 relative to an end 412 of the image slice 404. Such information may be included in the signal (e.g., the path-following-error signal) transmitted to the controller 208 to allow the controller 208 to control the operation of the printhead 300. For example, the encoding pattern 324 may signal the controller 208 to synchronize or align a new image slice 406 being printed with the existing image slice 408, or to signal to the controller 208 to halt the ejection of droplets 330 in correspondence with the end of the existing image slice 408.

Figure 16:
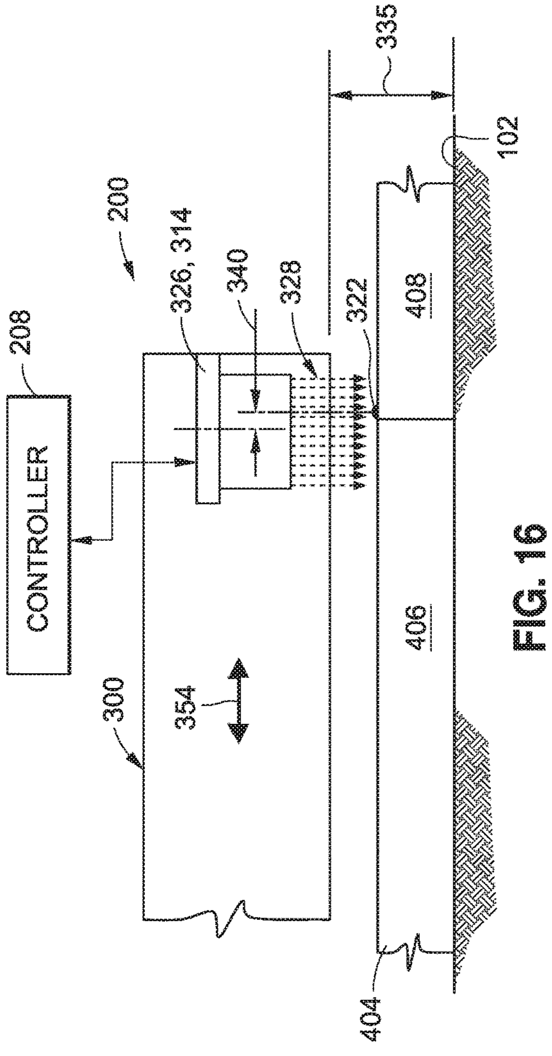
FIG. 16 is a magnified view of an example of a printhead having a reference line sensor for sensing the reference line of an existing image slice.

FIG. 16 is a magnified view of an example of a printhead 300 having a reference line sensor 326 for sensing a reference line 322 of an image slice 404. The reference line sensor 326 may transmit to the controller 208 (FIG. 14) a path-following-error signal representing the lateral spacing 340 between the reference line 322 and an indexing feature. The indexing feature may be the centerline of the reference line sensor 326, a hardpoint on the printhead 300 such as the nozzle 308 at an extreme end of the printhead 300, or some other indexing feature. As the printhead 300 is moved along a rastering path 350, the reference line sensor 326 may sense and transmit (e.g., continuously, in real-time) the path-following-error signal to the controller 208 representing the lateral spacing 340. Based on the signal, the controller 208 may cause the lateral position of the printhead 300 to be adjusted (e.g., by the arm) such that the side edge 416 of the new image slice 406 is maintained in alignment with the side edge 416 of an existing image slice 408.

The reference line sensor 326 may be configured as an optical sensor of a vision system. In FIG. 16, the optical sensor may emit an optical beam 328 (e.g., an infrared beam) for detecting the reference line 322. The optical sensor may generate a signal (e.g., a path-following-error signal) representing the lateral location where the optical beam 328 strikes the reference line 322. The signal may be transmitted to the robot 202 controller 208 on demand, at preprogrammed time intervals, continuously, or in other modes. In one example, the reference line sensor 326 may provide real-time alignment feedback to the robot 202 controller 208 for manipulating or adjusting the printhead 300 such that the side edges 416 of the new image slice 406 and existing image slice 408 are aligned. For example, the robot 202 may adjust the lateral position of the printhead 300 such that the side edges 416 of the new image slice 406 and the existing image slice 408 are aligned in non-gapped and/or non-overlapping relation as a new image slice 406 is being printed.

In other examples, instead of adjusting the lateral position of the printhead 300, the robot controller 208 may maintain the lateral position of the printhead 300 during movement along the rastering path 350, and the controller 208 may electronically control or shift the nozzles 308 on the printhead 300 that are actively ejecting droplets 330. In this regard, a printhead 300 may have additional (e.g., unused) nozzles 308 located at one or both of the widthwise ends 306 of the printhead 300. Upon the controller 208 determining that a new image slice 406 is misaligned with an existing image slice 408, the controller 208 may activate one or more of the unused nozzles 308 at one of the widthwise ends 306, and deactivate an equal number of nozzles 308 at an opposite widthwise end 306 of the printhead 300 to maintain the same image slice width of the new image slice 406 while effectively shifting the lateral position of the new image slice 406 without laterally moving the printhead 300. In this regard, an image slice 404 may be electronically offset in real-time or near real-time such that the side edge 416 of the new image slice 406 is maintained in non-gapping and/or non-overlapping relation with the side edge 416 of an existing image slice 408. In this manner, the reference line 322 advantageously provides a means for the printhead 300 to precisely maintain a nominal distance of a new image slice 406 relative to the rastering path 350 of an existing or previous-applied image slice 404, and thereby avoid gap between the image slices 404.

Figure 17:
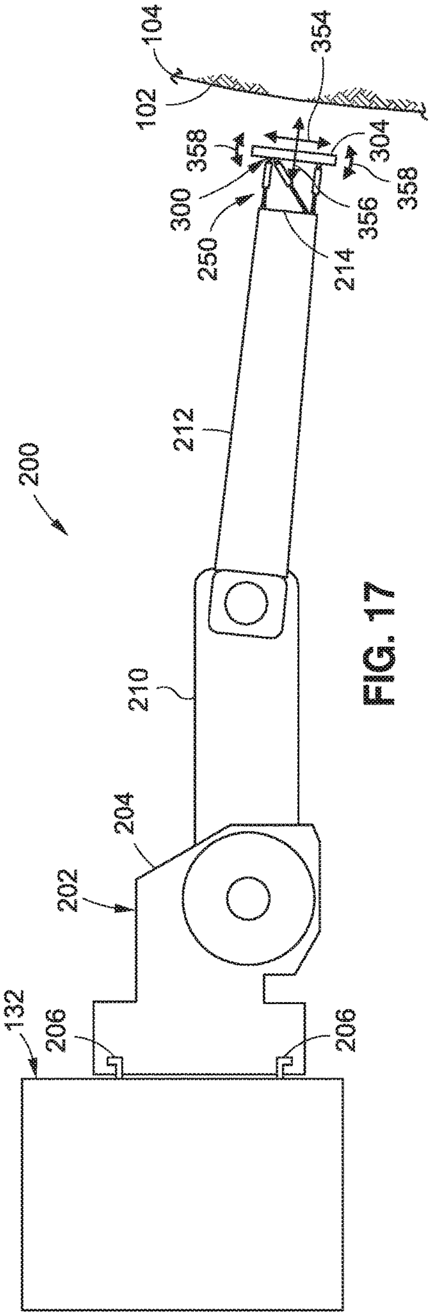
FIG. 17 is a side view of an example of a robot having one or more high-bandwidth actuators coupling the printhead to an arm of the robot.

FIG. 17 is a side view of an example of a robot 202 having high-bandwidth actuators 250 coupling the printhead 300 to an arm of the robot 202 and showing the printhead 300 printing an image 400 (e.g., an aircraft livery 402) on a surface 102 of a fuselage 104. As indicated above, a relatively large robot 202 may be required for printing large surfaces 102. Such a large-scale robot 202 may have a relatively high mass and relatively low stiffness which may result in an inherently large tolerance band of movement at the end 214 of the arm (e.g., the last axis of the robot) on which the printhead 300 may be mounted. In attempts to compensate for such inherently large tolerances, a large-scale robot 202 may require extensive computer programming (e.g., CNC or computer-numerical-control programming) which may add to production cost and schedule. Advantageously, by printing image slices 404 with the above-described image gradient bands 418 (FIGS. 7-12) and/or reference lines 322 (FIGS. 13-16 and 24-31), the robot-mounted printhead 300 of the present disclosure may print a high-quality image 400 on a surface 102 without the occurrence of gaps between adjacent image slices 404 that would otherwise detract from the overall quality of the image.

In FIG. 17, one or more high-bandwidth actuators 250 may be mounted in series with the one or more arms of the robot 202. Such high-bandwidth actuators 250 may couple a printhead 300 (e.g., FIGS. 18, 19, 25 and 29) to the last axis or arm of the robot 202 and provide a relatively small tolerance band for adjusting the orientation and/or position of the printhead 300 relative to the surface 102 during movement of the printhead 300 along a rastering path 350 such that a new image slice 406 may be accurately aligned with an existing image slice 408. The high-bandwidth actuators 250 may be described as high-bandwidth in the sense that the high-bandwidth actuators 250 may have small mass and inherently high stiffness which may result in increased precision and rapid response time in positioning and orienting a printhead 300 relative to the large mass, low stiffness, and corresponding slow response time of a large-scale robot 202. Further in this regard, the high-bandwidth actuators 250 may rapidly respond to commands from the robot controller 208 based on path-following-error signals provided in real-time by the reference line sensor 326.

Referring still to FIG. 17, the system 200 may include one or more high-bandwidth actuators 250 which may be configured to adjust the position of the printhead 300 along at least one of the following directions: (1) a transverse direction 354 of translation of the printhead 300 parallel to the surface 102 and perpendicular to the rastering path 350, (2) a normal direction 356 of translation of the printhead 300 locally normal to the surface 102, and (3) a roll direction 358 of rotation of the printhead 300 about an axis parallel to the rastering path 350. In addition, one or more high-bandwidth actuators 250 may be configured to adjust the position of the printhead 300 along other directions including, but not limited to, a parallel direction 352 of translation which may be described as parallel to the primary direction of movement of the printhead 300 along the rastering path 350 during the printing of an image slice 404.

Figure 18:
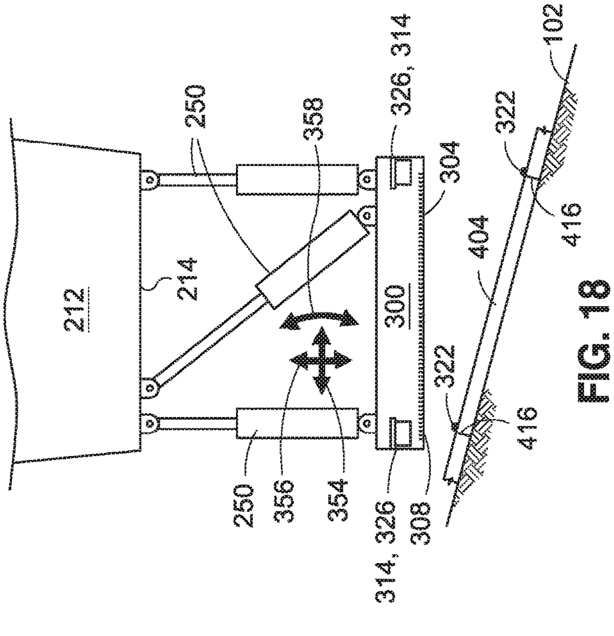
FIG. 18 is a side view of an example of a plurality of high-bandwidth actuators coupling a printhead to an arm of a robot.

FIG. 18 shows an example of three (3) high-bandwidth actuators 250 coupling a printhead 300 to an arm of a robot 202 (FIG. 17). In an example, the high-bandwidth actuators 250 include a first actuator 250*a*, a second actuator 250*b*, and a third actuator 250*c* which may be generally aligned in an in-plane tripod configuration enabling adjustment of the printhead 300 along the transverse direction 354, the normal direction 356, and the roll direction 358 as described above. The first, second, and third actuators 250*a*, 250*b*, 250*c* may each have an upper end 268 and a lower end 270. The upper ends 268 of the first, second, and third actuators 250*a*, 250*b*, 250*c* may be pivotably coupled to the end of the arm of the robot and may have parallel pivot axes. The lower ends 270 of the first, second, and third actuators 250*a*, 250*b*, 250*c* may be pivotably coupled to the printhead 300 and may also have parallel pivot axes. As shown in FIG. 18, the upper ends 268 of the first 250*a* and third actuator 250*c* are spaced apart from one another at the pivotable attachment to the end 214 of the arm, and the lower ends 270 of the first 250*a* and third actuator 250*c* are spaced apart from one another at the pivotable attachment to the printhead 300. In this regard, the first actuator 250*a* and the third actuator 250*c* may be oriented generally parallel to one another. However, the first actuator 250*a* and the third actuator 250*c* may be oriented non-parallel relation to one another without detracting from the movement capability of the printhead 300 along the transverse direction 354, the normal direction 356, and the roll direction 358.

In FIG. 18, the upper end 268 of the second actuator 250*b* may be located adjacent to the upper end 268 of the first actuator 250*a*. The lower end 270 of the second actuator 250*b* may be located adjacent to the lower end 270 of the third actuator 250*c* such that the second actuator 250*b* extends diagonally between the upper end 268 of the first actuator 250*a* and the lower end 270 of the third actuator 250*c*. In operation, the first, second, and third actuators 250*a*, 250*b*, 250*c* may be extended and retracted by different amounts to adjust the printhead 300 along the transverse direction 354, the normal direction 356, and the roll direction 358. In any one of the examples disclosed herein, one or more of the high-bandwidth actuators 250 may be configured as pneumatic cylinders or in other high-bandwidth actuator configurations including, but not limited to, hydraulic cylinders, electromechanical actuators, or other actuator configurations. In FIG. 18, the printhead face 304 is oriented non-parallel to the surface 102 and laterally offset relative to the reference line 322.

Figure 19:
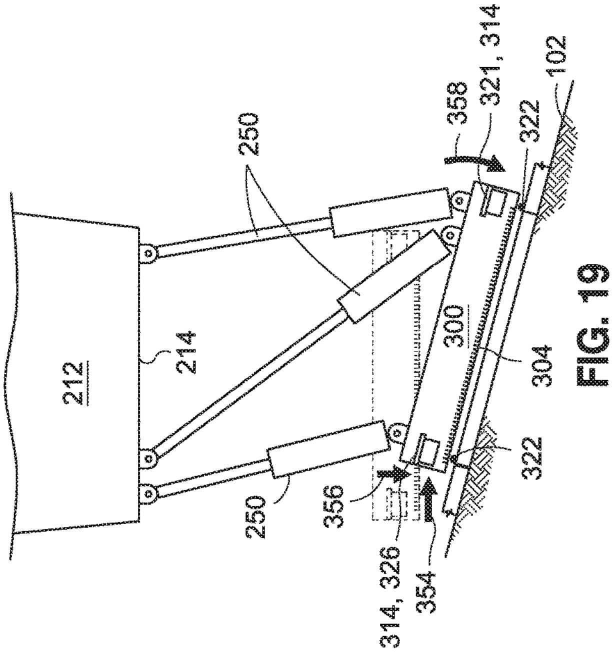
FIG. 19 is a side view of the printhead after repositioning by the high-bandwidth actuators into alignment with the reference line and reorientation of the printhead face parallel to the surface.

FIG. 19 is a side view of the printhead 300 after being repositioned by the high-bandwidth actuators 250 (e.g., the first, second, and third actuators 250*a*, 250*b*, 250*c*) into alignment with the reference line 322 and reorientation of the printhead face 304 into parallel relation with the surface 102. In this regard, the controller 208 (FIG. 14) may command the translation and re-orientation of the printhead 300 based on continuous input signals that may be received in real-time from the position sensors 314 and/or reference line sensors 326 tracking the reference line 322 during printing of a new image slice 406. For example, the high-bandwidth actuators 250 may translate the printhead 300 along the transverse direction 354 and the normal direction 356 and may rotate the printhead 300 along the roll direction 358 to orient the printhead face 304 parallel the local surface 102 while aligning the side edge 416 of a new image slice 406 with the side edge 416 of an existing image slice 408.

Figure 20:
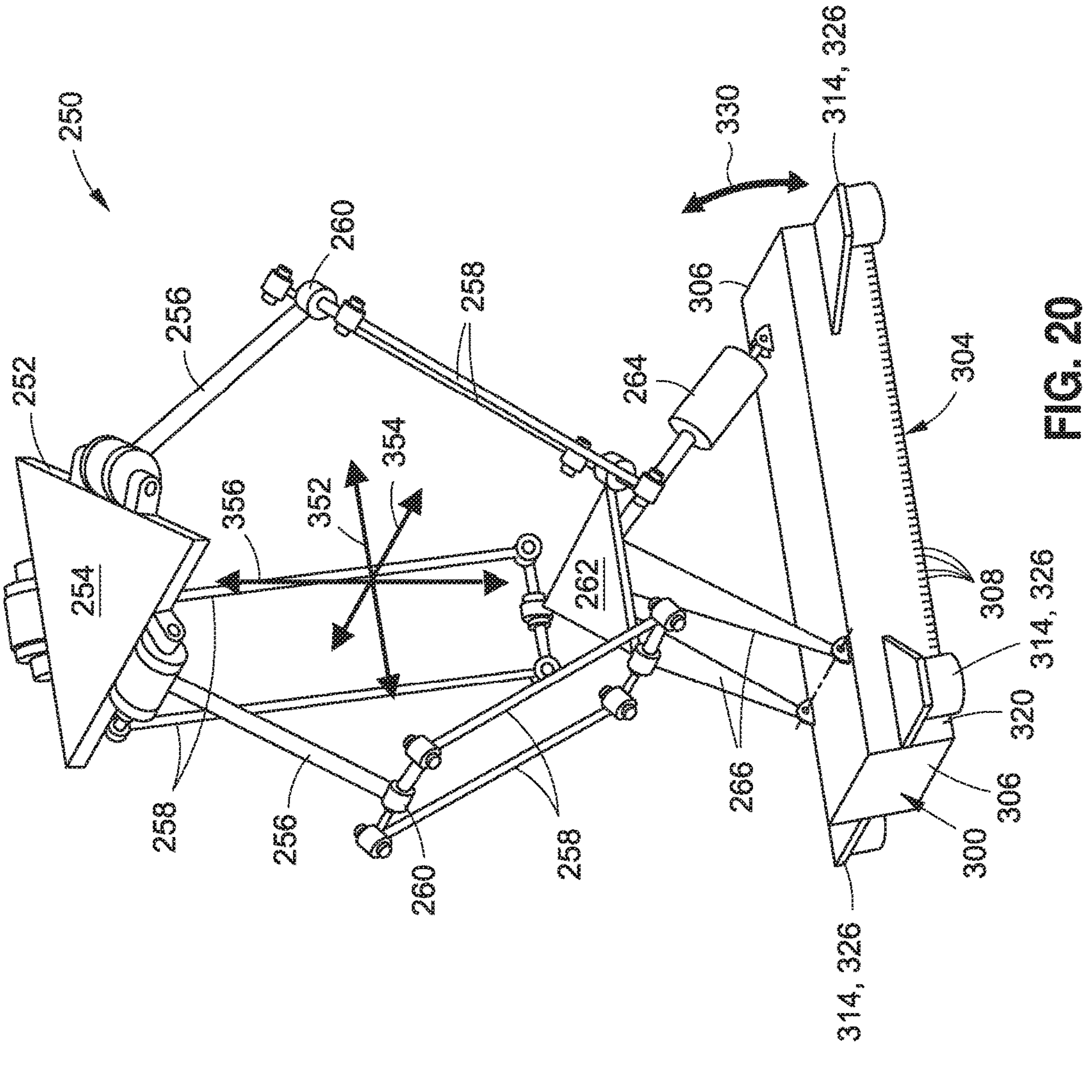
FIG. 20 is a perspective view of an example of a delta robot having a plurality of high-bandwidth actuators coupling the printhead to an arm of a robot.

FIG. 20 is a further example of high-bandwidth actuators 250 configured as a delta robot 252 and mounted in series with the robot arm and coupling the printhead 300 to the end 214 (FIG. 19) of the robot arm (FIG. 17). In FIG. 20, the delta robot 252 may include an actuator base 254 which may be attached to the end 214 of a robot arm (e.g., a second arm 212). Three (3) actuator upper arms 256 may be pivotably coupled to the actuator base 254 and may have co-planar pivot axes oriented at 60 degrees relative to one another. Each actuator upper arm 256 may be coupled by a hinge joint 260 to a pair of actuator lower arms 258. Each pair of actuator lower arms 258 may be configured as a parallelogram four-bar-mechanism. Each one of three (3) pairs of lower arms 258 may be pivotably coupled to an actuator platform 262 through six (6) hinge joints wherein each hinge joint is capable of rotation about a single axis. The three (3) parallelogram four-bar-mechanisms of the three (3) actuator lower arms 258 limit movement of the actuator platform 262 to translation (e.g., movement in the x-y direction) and extension (e.g., movement in the z-direction), and prevent rotation of the actuator platform 262. In this regard, the actuator platform 262 is maintained in parallel relation with the actuator base 254 regardless of the direction of translation and/or extension of the actuator platform 262. In an example not shown, the delta robot 252 may be provided with spherical joints (not shown) and upper and lower arms (not shown) arranged in a manner that maintains the actuator platform 262 in parallel relation to the actuator base 254 during translation and/or extension of the actuator platform 262.

In FIG. 20, the translation capability of the actuator platform 262 provides for translation of the printhead 300 along the above-described transverse direction 354 (e.g., the y-direction) and normal direction 356 (e.g., the z-direction) relative to the surface 102 being printed. The high-bandwidth actuator 250 arrangement of FIG. 20 may provide rotational capability of the printhead 300 along the roll direction 358 by means of one or more roll actuators 264 for pivoting the printhead 300 about one or more attachment links 266. The upper ends of the attachment links 266 may be fixedly coupled to the actuator platform 262. The lower ends of the attachment links 266 may be pivotably coupled to the printhead 300. The high-bandwidth actuator 250 arrangement of FIG. 20 may represent a low mass, high stiffness actuator system providing increased precision and improved response time for adjusting the position of the printhead 300 according to a path-following-error that may be resolved using the reference line sensor 326 tracking the reference line 322 of an existing image slice 408. As indicated above, the high-bandwidth actuators 250 may adjust the position and/or orientation of the printhead 300 with a precision that may be unobtainable with the robot 202 acting alone.

Figure 21:
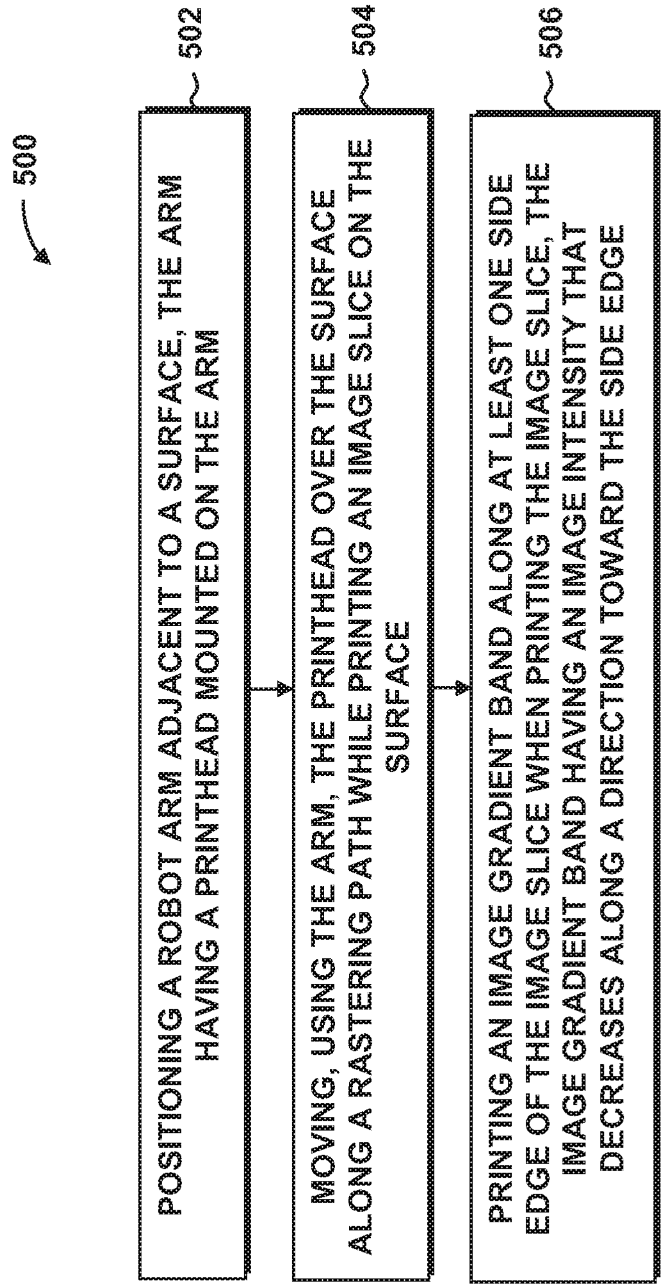
FIG. 21 is a flowchart having one or more operations included in method of printing an image on a surface wherein the parallel image slices each have one or more image gradient bands along the side edges of the image slices.

FIG. 21 is a flowchart of one or more operations that may be included in method 500 of printing an image 400 on a surface 102. The method may be implemented using the system 200 described above. Step 502 of the method 500 may include positioning an arm of a robot 202 adjacent to a surface 102. As indicated above, a printhead 300 may be mounted on an end 214 of the arm. In some examples, the printhead 300 may be an inkjet printhead 300 having an array of nozzles 308 or orifices for ejecting droplets 330 of ink, paint, or other fluids or colorants.

Step 504 of the method 500 may include moving, using the arm, the printhead 300 over the surface 102 along a rastering path 350 while the printhead 300 prints an image slice 404 on the surface 102, as shown in FIG. 7. The printhead 300 may be moved by the arm along the rastering path 350 to print a new image slice 406 in parallel relation to an existing image slice 408.

Step 506 of the method 500 may include printing an image gradient band 418 along at least one side edge 416 of an image slice 404 when printing the image slice 404 on the surface 102, as shown in FIG. 8. As described above, the image gradient band 418 may have an image intensity that decreases along a transverse direction 354 (e.g., relative to the rastering path 350) toward a side edge 416 of the image slice 404. In some examples, the image gradient of the image gradient band 418 may be linear (e.g., a linear decrease in the image density) along the transverse direction 354. In other examples, the image gradient of an image gradient band 418 may be non-linear.

As shown in FIG. 8, a printhead 300 may print a new image slice 406 such that the image gradient band 418 of the new image slice 406 overlaps the image gradient band 418 of an existing image slice 408. For example, the side edge 416 of the new image slice 406 may be aligned with an inner boundary 420 of an overlapping or overlapped image gradient band, as mentioned above. The method may include printing, using the printhead 300, the image gradient band 418 of the new image slice 406 and the existing image slice 408 such that the overlapping image gradient bands 418 have a collective image intensity that is equivalent to the image intensity of the inner portion 414 of the new image slice 406 and/or the existing image slice 408

As shown in FIG. 9 and mentioned above, an image gradient band 418 may be generated by ejecting droplets 330 from the printhead 300 nozzles 308 with progressively larger droplet spacings 332 along a direction toward the side edge 416 of the image slice 404 as compared to a uniform droplet spacing 332 for the nozzles 308 that print the inner portion 414 of the image slice 404. As shown in FIG. 10, an image gradient band 418 may also be generated by ejecting progressively smaller droplet sizes 334 along a direction toward the side edge 416. The method may optionally include forming a new image slice 406 with an image gradient end (not shown) on at least one of opposing ends of the new image slice 406 as a means to blend or feather the image slice 404 into an area bordering the new image slice 406.

Figure 22:
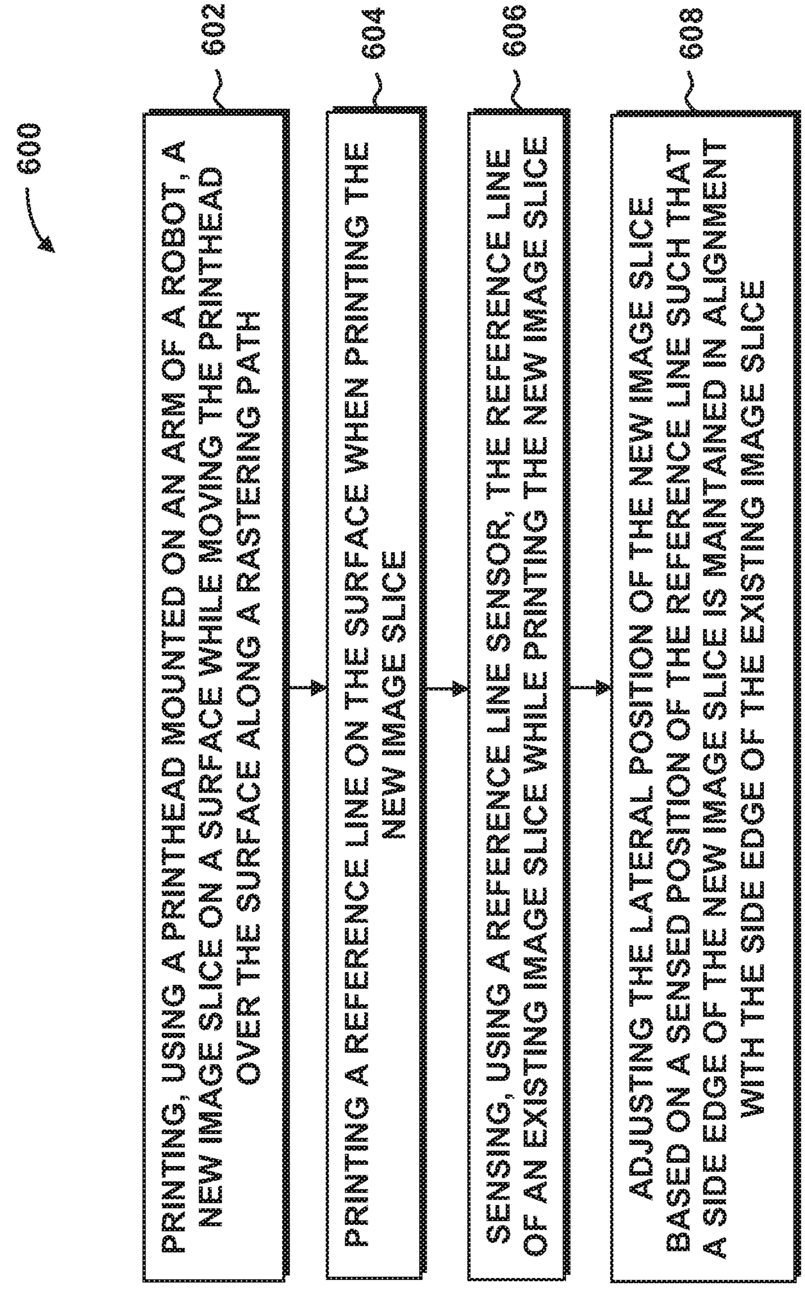
FIG. 22 is a flowchart having one or more operations included in a method of printing an image on a surface wherein the image slices have a reference line for aligning a new image slice with an existing image slice.

FIG. 22 is a flowchart of one more operations that may be included in a further method 600 of printing an image 400 on a surface 102. Step 602 of the method 600 may include printing, using a printhead 300 mounted on an arm of a robot 202, a new image slice 406 on the surface 102 while moving the printhead 300 over the surface 102 along a rastering path 350. Step 604 of the method 600 may include printing a reference line 322 on the surface 102 when printing the new image slice 406, as shown in FIG. 13 and described above. The printhead 300 may include a reference line printing mechanism 320 configured to print the reference line 322 on the surface 102 when printing the new image slice 406. In some examples, the reference line printing mechanism 320 may comprise at least one nozzle 308 of the printhead 300 which may eject ink or paint that is a different color that the ink or paint ejected by adjacent nozzles 308. In other examples, the reference line printing mechanism 320 may comprise a dedicated reference line printer (not shown).

The printhead 300 may print a reference line 322 on at least one of opposing side edges 416 of a new image slice 406 when printing the new image slice 406. The step of printing the reference line 322 may include printing the reference line 322 with at least one encoding pattern 324 along at least a portion of the reference line 322. The encoding pattern 324 may comprise a series of line segments separated by gaps. The encoding pattern 324 may alternatively or additionally comprise localized changes in the color of the reference line 322, or a combination of both line segments, gaps, color changes, and other variations in the reference line for encoding information. The encoding pattern 324 may represent information regarding the image slice 404 such as the distance to the end 412 of the image slice 404 or other information about the image 400. The information may be transmitted to the controller 208 which may adjust one or more printing operations based on the information contained in the encoding pattern 324.

Step 606 of the method 600 may include sensing, using a reference line sensor 326 included with the printhead 300, the reference line 322 of an existing image slice 408 while printing the new image slice 406. As indicated above, a reference line sensor 326 may sense the reference line 322 of an existing image slice 408 and transmit a signal (e.g., a path-following-error signal) to the robot 202 and/or controller 208 causing the arm to adjust the printhead 300 such that the side edge 416 of the new image slice 406 is aligned with and/or is maintained in non-gapping and non-overlapping relation with the side edge 416 of the existing image slice 408.

Step 608 of the method 600 may include adjusting the lateral position of the new image slice 406 based on a sensed position of the reference line 322 to align a side edge 416 of the new image slice 406 with the side edge 416 of the existing image slice 408. In one example, the method may include detecting a misalignment of the side edge 416 of a new image slice 406 with the side edge 416 of an existing image slice 408 and providing real-time alignment feedback to the robot 202 and/or controller 208 for manipulating or adjusting the lateral position of the printhead 300 such that the side edge 416 of the new image slice 406 is aligned with the side edge 416 of the existing image slice 408. In this regard, the step of adjusting the lateral position of the new image slice 406 may include transmitting a signal from the reference line sensor 326 (e.g., an optical sensor) to the robot 202 and/or controller 208. The robot 202 and/or controller 208 may determine a correction input for the robot based on the misalignment of the printhead 300.

The method may include adjusting the position of the printhead 300 such that the side edge 416 of the new image slice 406 is maintained in non-gapped and non-overlapping relation with the side edge 416 of the existing image slice 408. In this regard, the lateral position of the printhead 300 may be physically adjusted to align the side edge 416 of the new image slice 406 with the side edge 416 of the existing image slice 408. Alternatively, the method may include electronically shifting the nozzles 308 that are actively ejecting droplets 330 to align the side edge 416 of the new image slice 406 with the side edge 416 of the existing image slice 408, as mentioned above.

The adjustment of the position and/or orientation of the printhead 300 may be facilitated using one or more high-bandwidth actuators 250 coupling the printhead 300 to an end 214 of an arm of the robot 202, as described above and illustrated in FIGS. 17-20. The high-bandwidth actuators 250 may adjust an orientation and/or position of the printhead 300 relative to the surface 102 during movement of the printhead 300 along the rastering path 350. The reference line sensor 326 may sense the reference line 322 and transmit a signal to the robot 202 for determining an adjustment to the lateral position of the printhead 300. The robot 202 and/or controller 208 may command the high-bandwidth actuators 250 to adjust the position of the printhead 300 such that the side edge 416 of the new image slice 406 is maintained in non-gapped relation with the side edge 416 of the existing image slice 408.

The method may include adjusting the printhead 300 by translating the printhead 300 along a transverse direction 354 parallel to the surface 102 and perpendicular to the rastering path 350, translating the printhead 300 along a normal direction 356 that is normal to the surface 102, and/or rotating the printhead 300 along a roll direction 358 about an axis parallel to the rastering path 350. Advantageously, the high-bandwidth actuators 250 may provide increased precision and rapid response time in adjusting the position and/or orientation of the printhead 300.

Figure 27:
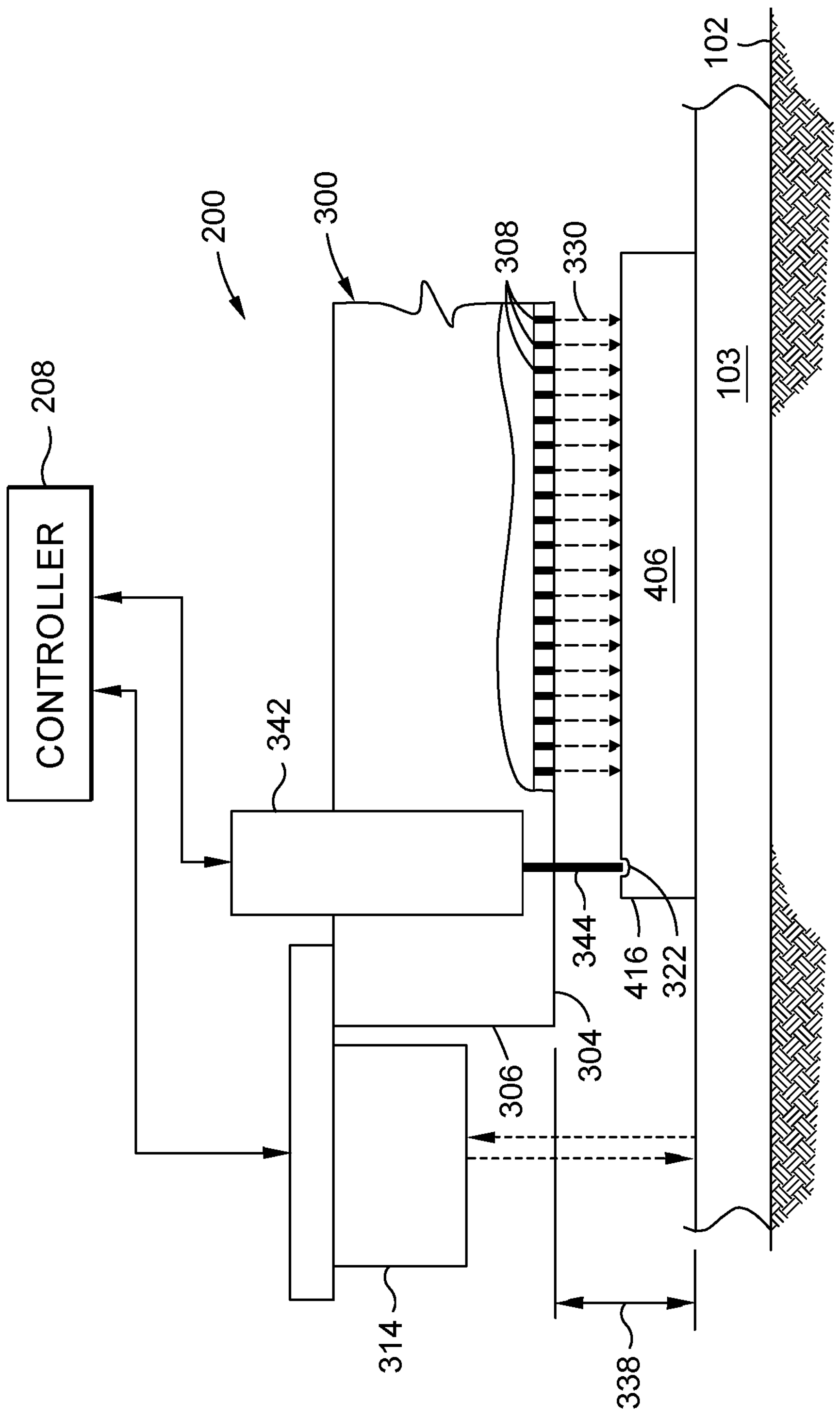
FIG. 27 is a magnified view taken along line 27 of FIG. 25 and showing an example of a laser device for etching a reference line into a new image slice during printing of the new image slice by the printhead.
Figure 28:
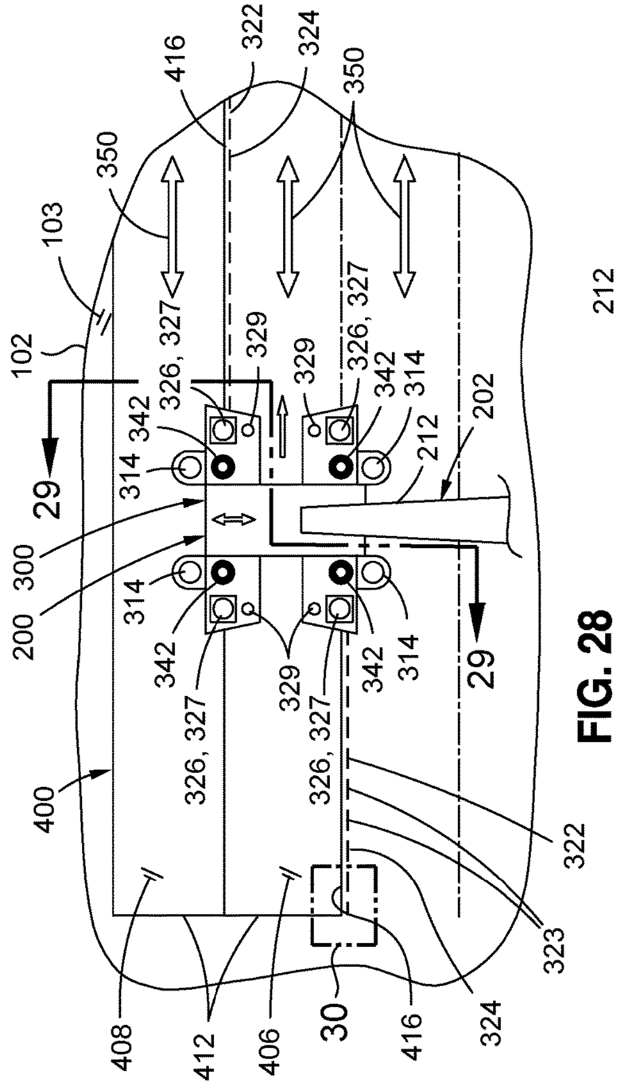
FIG. 28 is a plan view of an example of a printhead in which the laser device is configured to etch the reference line into a basecoat covering the surface onto which the new image slice is printed.
Figure 29:
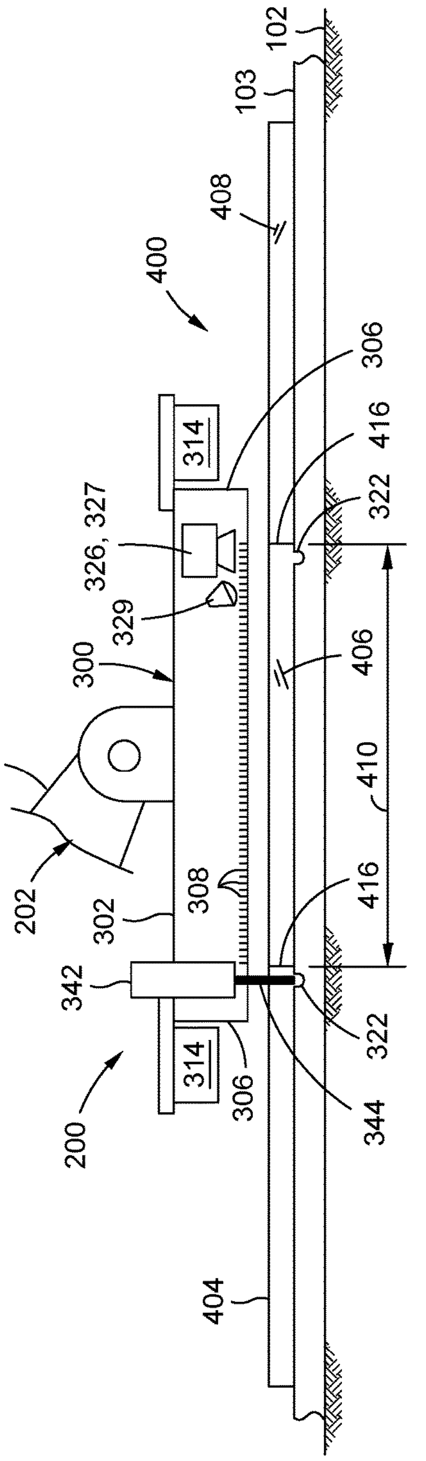
FIG. 29 is a sectional view taken along line 29 of FIG. 28 and illustrating a laser device etching the reference line into the basecoat at a location immediately adjacent to a side edge of the new image slice.

Referring now to FIGS. 23-31, disclosed are examples of an image forming system 200 (FIGS. 23-29) and method 700 (FIG. 31) that uses one or more laser devices 342 (e.g., FIGS. 24-25) for etching a reference line 322 during the printing of a new image slice 406. As described in greater detail below, in one example of the image forming system 200 shown in FIGS. 24-27, as the printhead 300 prints a new image slice 406, the laser device 342 etches a reference line 322 into the new image slice 406. In an alternative and preferred example of the image forming system 200 shown in FIGS. 28-30, the laser device 342 etches the reference line 322 into a basecoat 103 that may be previously applied to the surface 102. The laser device 342 may etch the reference line 322 into the basecoat 103 at a location immediately adjacent to a side edge 416 of the new image slice 406 as shown in FIG. 29.

The printhead 300 of the image forming system 200 includes at least one reference line sensor 326 configured to detect and/or sense the reference line 322 of an existing image slice 408. The reference line sensor 326 is configured to transmit a path-following-error signal to the robot 202 to correct or adjust the printhead 300 in a manner such that the side edge 416 of the new image slice 406 is maintained in alignment with the side edge 416 of an existing image slice 408 during the printing of the new image slice 406.

Referring to FIG. 23, shown is an example of the image forming system 200 printing an image 400 on a vertical tail 112 of an aircraft 100. As described above, the printhead 300 may be coupled to an arm (e.g., a second arm 212) of a robot 202 which may have a base 128 (FIGS. 4-5) that may be supported on a gantry 124 as shown in FIGS. 2-5. Alternatively, the base (not shown) of the robot 202 may be mounted on another type of movable platform (not shown), or the base of the robot 202 may be non-movably supported on or fixed to a shop floor (not shown). As described in greater detail below, the use of a laser device 342 for etching a reference line 322 provides a means for increasing the precision with which the printhead 300 can be controlled during the printing of an image 400 on a surface 102. Advantageously, the increased precision of control of the printhead 300 allows for increased accuracy in maintaining new image slices 406 in alignment with existing image slices 408, resulting in an overall improvement in the quality and appearance of the completed image 400.

In FIG. 23, the arm of the robot 202 is configured to move the printhead 300 over the surface 102 along parallel rastering paths 350 (FIG. 24) for printing a plurality of image slices 404 in parallel, side-by-side relation to each other to collectively form the image 400 being printed. As described in greater detail below, the laser device 342 emits a laser beam 344 configured to vaporize or ablate an upper surface of a new image slice 406 (e.g., FIGS. 24-27) or basecoat 103 (e.g., FIGS. 28-30) and thereby form a reference line 322. Advantageously, the vaporization or ablation of the upper surface of the new image slice 406 or basecoat 103 is performed without burning and/or without significantly altering the color of the new image slice 406 or basecoat 103. The reference line 322 may be described as a small groove that penetrates only the upper surface of the new image slice 406 or basecoat 103, and may be formed at a relatively shallow line depth (FIG. 26) and relatively narrow line width (FIG. 26). Due to the ablation of the upper surface of the new image slice 406 or basecoat 103, the reference line 322 has a reduced level of gloss, shine, or reflectivity relative to the level of gloss, shine, or reflectivity of the surrounding area adjacent to the reference line 322, allowing the reference line 322 to be sensed by one or more reference line sensors 326.

In FIG. 23, each one of the reference lines 322 may extend across an entire length of the image 400 which, in the example shown, comprises a series of numbers "777". The printhead 300 is configured to follow the reference line 322 of an existing image slice 408 while printing a new image slice 406 and simultaneously etching a new reference line 322 along each rastering path 350 for the printhead 300 to follow during the printing of a subsequent image slice (not shown). As mentioned above, the printhead 300 is controlled in a manner to start and stop the ejection of droplets 330 (e.g., FIGS. 26-27) of ink at the appropriate points along each rastering path 350 in longitudinal (i.e., parallel to the rastering path 350) correspondence with the image details (not shown) and/or color variations (not shown) in the existing image slice 408. In FIG. 23, the printhead 300 may be controlled in a manner to start and stop the ejection of droplets 330 in longitudinal correspondence with the outline of the numbers being printed.

Although an image slice 404 may start and stop at multiple locations along the length of the image slice 404, the reference lines 322 may extend continuously across the length of each image slice 404. As mentioned above, the reference lines 322 penetrate only the upper surface of an image slice 404 or a basecoat 103. After all image slices 404 have been printed and the image 400 is complete, a layer of clearcoat (not shown) may be applied over the surface 102 including over the completed image 400. The clearcoat may cover any exposed reference lines 322, resulting in the reference lines 322 having the same level of reflectivity as the surrounding area such that the reference lines 322 become visually imperceptible.

Figure 24:
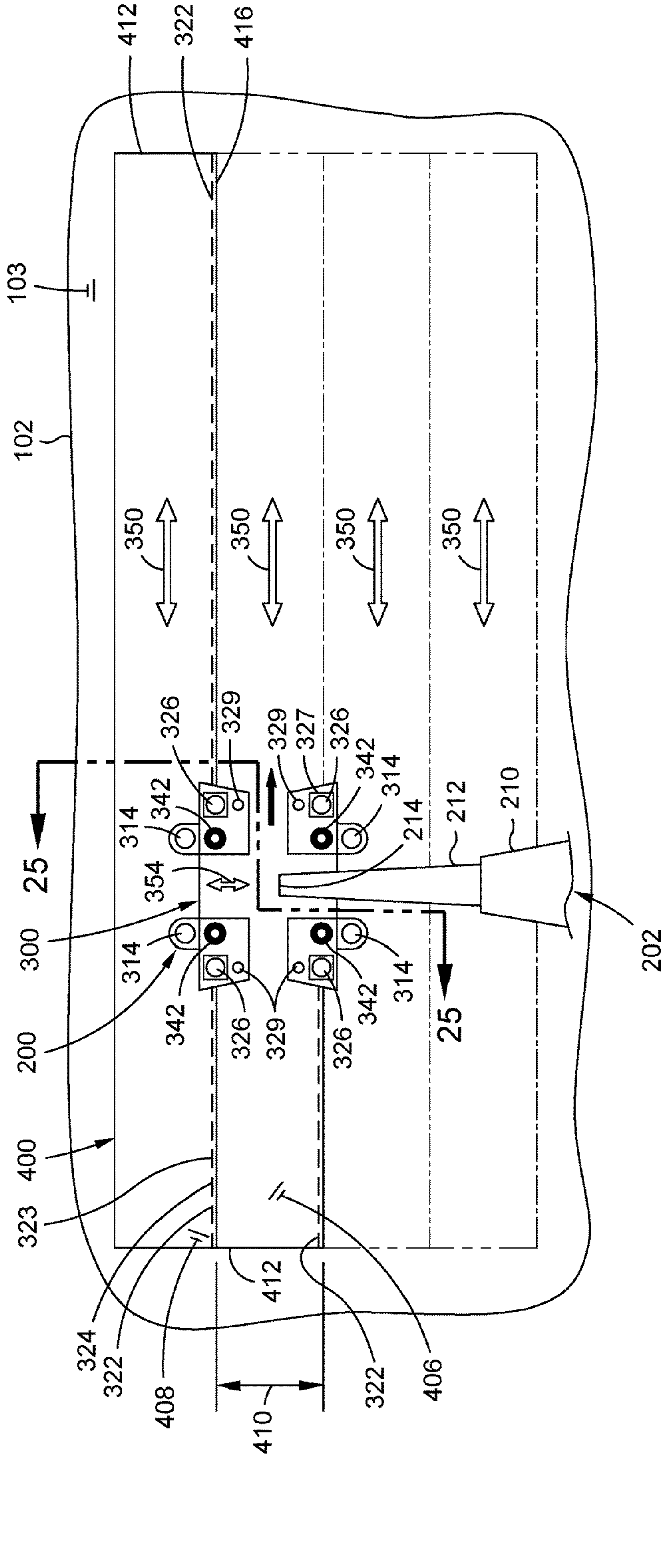
FIG. 24 is a plan view of the example of FIG. 23 and illustrating the printhead printing a new image slice while tracking a reference line previously etched into the existing image slice by the laser device and while etching a reference line into the new image slice.

Referring to FIG. 24, shown is an example of a printhead 300 printing a new image slice 406 while tracking a reference line 322 previously etched into the existing image slice 408 and while the laser device 342 etches a reference line 322 into the new image slice 406. As described above, the printhead 300 is movable by the arm of the robot 202 along each rastering path 350 for printing a new image slice 406. Each new image slice 406 is printed either directly onto the surface 102 uncoated (not shown), or onto a basecoat 103 covering the surface 102. The system 200 includes at least one laser device 342 and at least one reference line sensor 326. As described above, the reference line sensor 326 senses the reference line 322 of an existing image slice 408 and transmits a signal (e.g., a path-following-error signal) to the robot 202 causing the printhead 300 to be adjusted in a manner such that a side edge 416 of the new image slice 406 is aligned with the side edge 416 of an existing image slice 408. In the example shown, the printhead 300 includes a laser device 342 and a reference line sensor 326 at each one of the four (4) corners of the printhead 300. The laser devices 342 and the reference line sensors 326 may be coupled to the printhead 300 or integrated into the printhead 300, and move in unison with the printhead 300. For example, one or more laser devices 342 and one or more reference line sensors 326 may be coupled to opposite widthwise ends 306 of the printhead 300.

Figure 25:
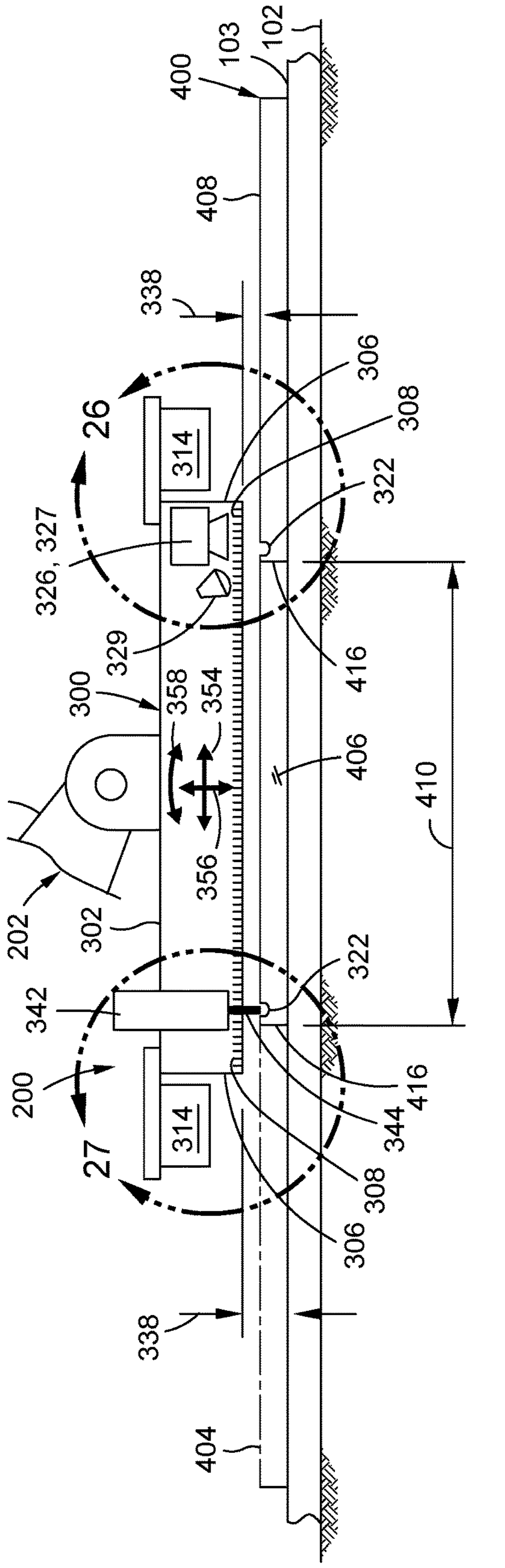
FIG. 25 is a sectional view taken along line 25 of FIG. 24 and illustrating the printhead having one or more position sensors, one or more laser devices, and one or more reference line sensors for sensing the reference line etched by the laser device.
Figure 26:
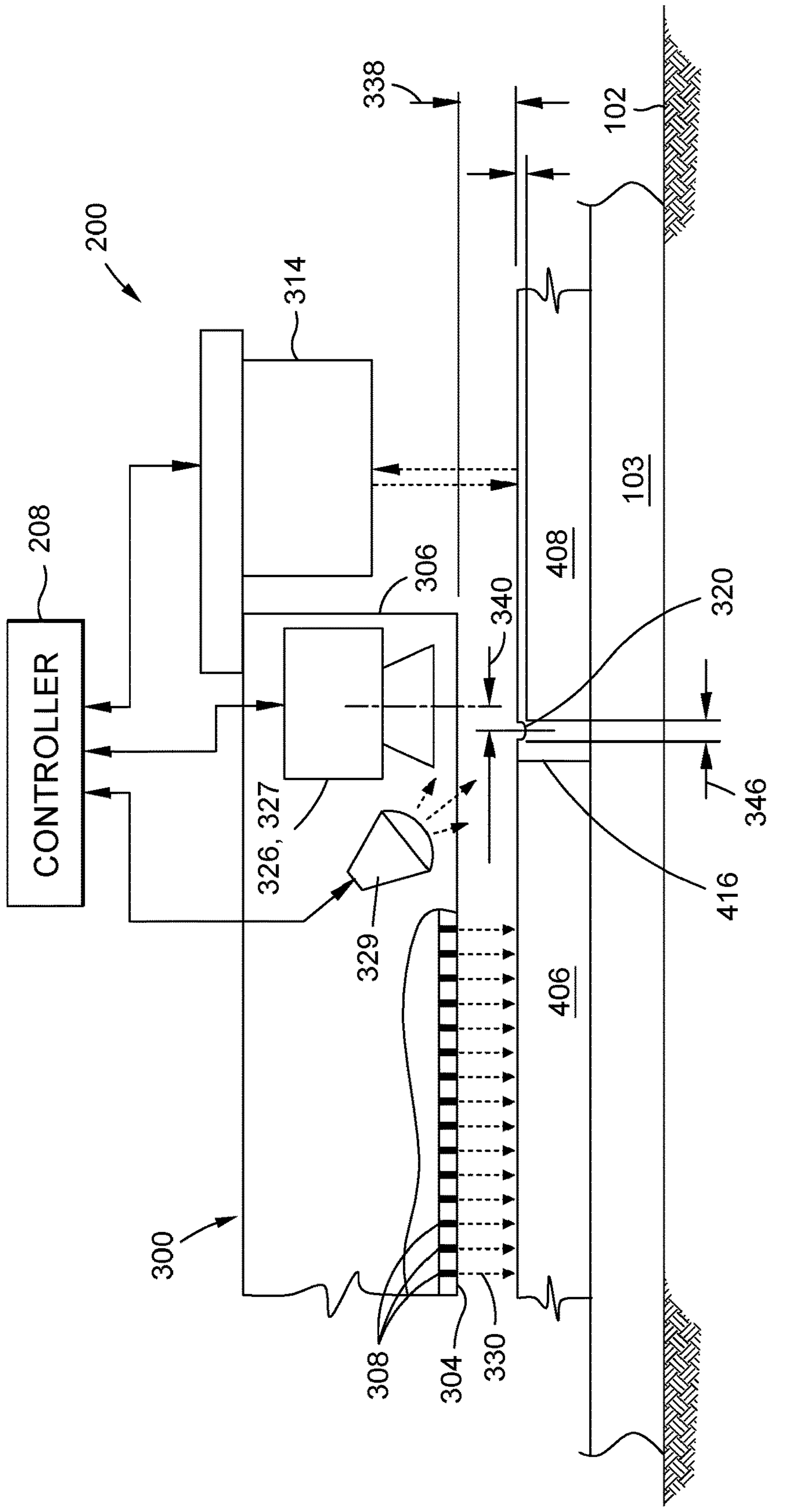
FIG. 26 is a magnified view taken along line 26 of FIG. 25 and showing one of the reference line sensors configured as a camera for detecting variations in specular reflectivity of the surface of the new image slice during illumination of the reference line and surrounding area by a light source coupled to the printhead.

Referring to FIGS. 24-25, the system 200 may be configured such that a single one of the laser devices 342 is activated to etch a reference line 322 when the printhead 300 is moved along a rastering path 350. Likewise, a single one of the reference line sensors 326 may be actively sensing the reference line 322 of an existing image slice 408 when the printhead 300 is moving along a rastering path 350. For a printhead 300 having multiple laser devices 342 and multiple reference line sensors 326, the selection of a laser device 342 for etching a new reference line 322, and the selection of a reference line sensor 326 for sensing an existing reference line 322 is dependent at least in part upon the movement direction of the printhead 300. For example, in FIG. 24 in which the existing image slice 408 is located above the new image slice 406 being printed, the printhead 300 is moving from left to right such that only the laser device 342 located in the lower left-hand corner of the printhead 300 is actively etching a reference line 322 into the new image slice 406 while the remaining laser devices 342 are inactive. Also in FIG. 24, only the reference line sensor 326 in the upper right-hand corner of the printhead 300 may be actively sensing the reference line 322 associated with the existing new image slice 406, while the remaining reference line sensors 326 are inactive.

However, in another example not shown in which the printhead 300 is moving along a direction from right to left while printing a new image slice 406, only the laser device 342 in the lower right-hand corner of the printhead 300 may be actively etching a reference line 322 while the remaining laser devices 342 are inactive. In such example, only the reference line sensor 326 in the upper left-hand corner of the printhead 300 may be actively sensing the reference line 322 associated with the new image slice 406 while the remaining reference line sensors 326 are inactive. In some examples, the system 200 may be configured such that two or more reference line sensors 326 are actively sensing a reference line 322 to provide a level of redundancy or to improve the accuracy with which a reference line 322 is sensed by averaging the sensed lateral spacing (e.g., FIG. 26) measurements generated by each reference line sensor 326.

In FIG. 26, shown is an example of a portion of a printhead 300 having a reference line sensor 326 and a position sensor 314 coupled to the printhead 300. As described above, the reference line sensor 326 may sense the reference line 322 etched in the existing image slice 408, and may transmit to a controller 208 of the robot 202 a path-following-error signal representing the lateral spacing 340 between the reference line 322 and an indexing feature. For example, as shown in FIG. 16, the reference line sensor 326 may be an optical sensor configured to emit an optical beam 328 (e.g., an infrared beam) and determine a lateral spacing 340 between an indexing feature and the lateral location where the optical beam 328 strikes the reference line 322. In the example, shown, the indexing feature may be the centerline of the reference line sensor 326.

During printing of a new image slice 406, the reference line sensor 326 may continuously or periodically sense the reference line 322 and transmit to the controller 208 the signal representing the lateral spacing 340. The controller 208 may process the signal and may adjust the lateral position of the printhead 300 to cause the side edge 416 of the new image slice 406 to be maintained in alignment with the side edge 416 of the existing image slice 408. In this regard, the robot 202 may adjust the lateral position of the printhead 300 along a transverse direction 354 in a manner such that the side edge 416 of the new image slice 406 is maintained in non-gapped and non-overlapping relation with the side edge 416 of the existing image slice 408. In some examples, the signal represents the magnitude of the error in the position (i.e., lateral position error) of the printhead relative to the reference line 322. The system 200 may include a position servo loop (not shown) for continuously correcting for the lateral position of the printhead 300 by minimizing the lateral distance between the current printhead location relative to a nominal printhead location (e.g., for non-gapped and non-overlapping image slices), causing the printhead 300 to be adjusted in a manner such that a side edge 416 of the new image slice 406 is maintained in alignment with the side edge 416 of the existing image slice 408.

In other examples, instead of adjusting the lateral position of the printhead 300, the controller 208 of the robot 202 may electronically shift or offset the nozzles 308 on the printhead 300 that are actively ejecting droplets 330. For example, as shown in FIG. 25, a printhead 300 may include additional nozzles 308 that are located at one or both of the widthwise ends 306 of the printhead 300. If the controller 208 determines that a new image slice 406 may become misaligned with an existing image slice 408 during printing of a new image slice 406, the controller 208 may activate one or more inactive nozzles (not shown) at one of the widthwise ends 306, and may deactivate an equal number of active nozzles (not shown) at an opposite widthwise end 306 of the printhead 300 as a means to shift the lateral position of the new image slice 406 without physically moving the printhead 300, and such that the new image slice 406 is maintained in non-gapped and non-overlapping relation with the side edge 416 of the existing image slice 408. In still further embodiments, the robot 202 may be configured to perform a combination of physically adjusting the lateral position of the printhead 300, and electronically shifting the nozzles 308 that actively eject droplets 330.

In FIG. 26, the optical sensor may be provided as a camera 327 such as color camera 327 or a monochrome camera. The camera 327 may be configured to visually acquire the reference line 322 and detect misalignment of the side edge 416 of the new image slice 406 with the side edge 416 of the existing image slice 408. In this regard, the camera 327 may be configured to continuously or periodically image the reference line 322 and surrounding area during the printing of a new image slice 406. The camera 327 may have a relatively high image resolution capability allowing the camera 327 to accurately sense the reference line 322 in a variety of lighting conditions. For example, the camera 327 may have an image resolution capability of greater than 1 megapixel, although image resolution capabilities of less than 1 megapixel are contemplated. The system 200 may further include a light source 329 that may be mounted to the printhead 300. The light source 329 may be oriented at a non-perpendicular angle relative to the basecoat 103 or new image slice 406 into which the reference line 322 is etched such that light emitted by the light source 329 may reflect off of the reference line 322 and surrounding area and may be received by the camera 327. The light source 329 may be configured to continuously illuminate the reference line 322 and surrounding area.

The camera 327 may be oriented to receive the light emitted by the light source 329 and reflected off of the reference line 322 and the surrounding area. The camera 327 may sense the lateral location of the reference line 322 based on variations in specular reflectivity of the surface into which the reference line 322 is etched. The camera 327 may periodically or continuously generate a signal representative of the lateral location of the reference line 322. The signal may be transmitted to the controller 208 of the robot 202 to provide real-time alignment feedback to allow the controller 208 to adjust the printhead 300 in a manner such that the side edge 416 of the new image slice 406 is maintained in alignment with the side edge 416 of the existing image slice 408. As mentioned above, the adjustment of the printhead 300 may include physically moving the printhead 300 during the printing of a new image slice 406 and/or the adjustment of the printhead 300 may include electronically offsetting or shifting nozzles 308 that actively eject droplets 330 of ink during the printing of a new image slice 406.

Referring to FIG. 27, shown is an example of a laser device 342 etching a reference line 322 into a new image slice 406 during the printing of the new image slice 406 by the printhead 300. As mentioned above, the laser device 342 is configured to etch the reference line 322 into the new image slice 406 (or into the basecoat 103—FIG. 29) at a relatively shallow depth. For example, the reference line 322 may be etched at a line depth 348 of less than approximately 0.005 inch and, more preferably, at a line depth 348 of less than approximately 0.001 inch although the reference line 322 may be etched at a line depth 348 of greater than 0.001 inch. In addition, the reference line 322 may be etched at a relatively narrow line width 346 such as a line width 346 in the range of approximately 0.002-0.010 inch, although line widths 346 larger than 0.010 inch are contemplated. The relatively small line depth 348 and line width 346 of the reference line 322 may result in the reference line 322 being visually imperceptible after the image 400 is coated with clearcoat (not shown).

In some examples, the laser device 342 may be provided as a Class 4 industrial laser capable of emitting a laser beam 344 in the range of approximately 1-5 watts in the visible spectrum. However, the laser device 342 may be provided as a Class 3 (or lower class) laser device 342 and may be configured to emit a laser beam 344 in the visible spectrum or in other spectrums such as in the infrared spectrum. As mentioned above, the laser device 342 may be configured to ablate the reference line 322 into the upper surface of a new image slice 406 or a basecoat 103 without burning or altering the local color of the new image slice 406 or basecoat 103. The required optical intensity of the laser beam 344 for ablating the surface to the extent required to form the reference line 322 may be dependent upon several factors including, but not limited to, the chemical composition of the new image slice 406 or basecoat 103, the printhead velocity, the focus requirements for etching the reference line 322 at the desired line depth 348 and line width 346, and other factors. The laser device 342 may be configured such that the laser beam 344 is focused when the printhead 300 is maintained at a desired normal spacing 338 (FIGS. 26-27) from the surface 102 for optimal printing. The laser device 342 may include laser optics (not shown) that cause the laser beam 344 to become unfocused at distances greater than the normal spacing 338.

Referring to FIGS. 26-27, the system 200 may include one or more position sensors 314 coupled to the printhead 300 and configured to measure the normal spacing 338 between the printhead 300 and the basecoat 103 and/or new image slice 406 or existing image slice 408. For example, the printhead 300 may include at least three positions sensors 314 (e.g., four position sensors 314 arranged in a rectangular pattern) provided as line lasers and configured to measure the normal spacing 338 at different locations on the printhead 300. The robot 202 may adjust the orientation of the printhead 300 based on the normal spacing 338 sensed by the position sensors 314 at each location as a means to maintain the printhead 300 locally parallel to the surface 102 during printing of the new image slice 406. In this manner, the nozzles 308 may be maintained approximately at a nominal distance from the surface 102 during the printing of each new image slice 406.

As indicated above, the normal spacing 338 is measured along a direction locally normal to the surface 102. As described above, the robot 202 may be configured to adjust the position of the printhead 300 based on the normal spacing 338 measured by the position sensor 314 in a manner maintaining the normal spacing 338 at a constant value. As mentioned above, the robot 202 may be configured to command the robot 202 arm and/or a high-bandwidth actuator 250 (e.g., FIGS. 17-20) to adjust the location and/or orientation of the printhead 300 relative to the local surface as a means to maintain the printhead 300 within a predetermined value of the normal spacing 338 for optimal printing of image slices 404. For example, the robot 202 may be configured to adjust the orientation of the printhead 300 to maintain the normal spacing 338 to within 0.010 inch of a predetermined value of the normal spacing 338. In examples where the position sensor 314 at one widthwise end 306 (FIG. 26) of the printhead 300 measures the normal spacing 338 relative to an image slice 404, and the position sensor 314 at the opposite widthwise end 306 (FIG. 27) of the printhead 300 measures the normal spacing 338 relative to the basecoat 103, the robot 202 (e.g., the controller 208) may adjust one of the normal spacing 338 measurements to compensate for the thickness of the image slice 404 in a manner such that the face of the printhead 300 is maintained in parallel relation to the surface 102 over which the new image slice 406 is being printed.

Figure 30:
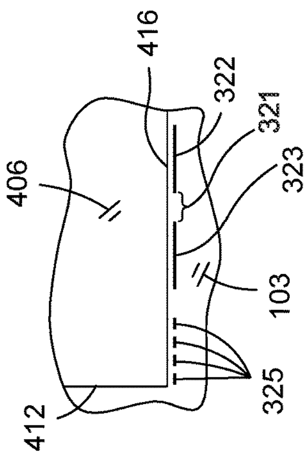
FIG. 30 is a magnified view of a portion of a new image slice showing the reference line etched as a series of line segments forming an encoding pattern representing information regarding the image being printed.

Referring to FIGS. 28-30, shown is an example of a printhead 300 of which the laser device 342 is configured to etch the reference line 322 into a basecoat 103 covering the surface 102 onto which the new image slice 406 is printed. The printhead 300 shown in FIG. 28 may be similar to the printhead 300 of FIG. 23, with the exception that the laser device 342 in FIG. 28 is configured, positioned, and/or oriented to etch the reference line 322 into the basecoat 103 at a location immediately adjacent to (e.g., within 1.0 inch) the side edge 416, as shown in FIG. 29. The reference line 322 is etched at a location that will be in the field of view of the reference line sensor 326 (e.g., a camera 327) during printing of a new image slice 406. In some examples, the laser device 342 may be movably mounted to the printhead 300 in a manner allowing one to capability to select whether the reference line 322 will be etched into the new image slice 406 (e.g., FIGS. 24-27) or into the basecoat 103 (e.g., FIGS. 28-31). The reference line sensor 326 may have a field of view capable of capturing the reference line 322 regardless of whether the reference line 322 is etched into the new image slice 406 on one side of the side edge 416 of the new image slice 406, or into the basecoat 103 on an opposite side of the side edge 416 of the new image slice 406.

FIG. 29 shows a laser device 342 etching a reference line 322 into a basecoat 103 and further illustrates a camera 327 for sensing the location of the reference line 322 based upon variations in specular reflectivity of light emitted by the light source 329 and reflecting off of the reference line 322 prior to the reference line 322 of the existing image slice 408 being printed over by the new image slice 406. As mentioned above, during the sensing of the reference line 322, the camera 327 may continuously generate and transmit a path-following-error signal to the robot 202 resulting in the adjustment of the printhead 300 such that the side edge 416 of the new image slice 406 is maintained in alignment with the side edge 416 of the existing image slice 408 during the printing of the new image slice 406. For example, the camera 327 may transmit the signal to the robot 202 resulting in a correction command to the high-bandwidth actuator 250 to adjust the printhead 300 in a manner such that the side edge 416 of the new image slice 406 is maintained in alignment with the side edge 416 of the existing image slice 408. In addition, position sensors 314 at one or more locations around the printhead 300 may continuously measure the normal space (e.g., normal distance) between the printhead 300 and the surface 102. The controller 208 may continuously receive from the position sensors 314 signals representing the normal spacing 338 measurements, and may adjust the orientation of the printhead 300 as required to maintain the printhead face 304 locally parallel to the surface 102 during printing of the new image slice 406.

In FIGS. 28 and 30, the laser device 342 may be configured to etch the reference line 322 with an encoding pattern 324 comprising a series of line segments 323 forming a dashed line. The line segments 323 may be of uniform length and uniform spacing separated by gaps. The laser device 342 may have a relatively short response time with pulsewidths in the millisecond range or less and allowing for the etching of correspondingly short line segments 323 that make up the reference line 322. The reference line sensor 326 (e.g., camera 327) may have a field of view of (e.g., less than 1 inch) that allows the camera 327 to view upcoming line segments 323 of the reference line 322. The reference line sensor 326 may continuously sense the line segments 323 and may continuously transmit a representative signal (e.g., a path-following-error signal) to the robot 202.

The controller 208 may determine the printhead velocity during the printing of the new image slice 406 based on the rate at which the line segments 323 are sensed by the reference line sensor 326, and may adjust the printhead velocity such that the printhead 300 is maintained at substantially the same (e.g., within 10 percent and, more preferably, within 1 percent) printhead velocity during printing of the new existing image slice 408 as the printhead velocity recorded during the printing of the existing image slice 408. For example, during the printing of the existing image slice 408, the laser device 342 may have etched a line segment 323 every 10 millisecond with a 5 millisecond (ms) gap between each line segment. If, during printing of the new image slice 406, the reference line sensor 326 senses a line segment 323 of the existing image slice 408 every 9 ms, then the controller 208 of the robot 202 may reduce the printhead velocity until the reference line sensors 326 sense a spacing of 10 ms between line segments 323. The printhead velocity may be adjusted via the above-described high-bandwidth actuator 250 (e.g., FIGS. 17-20) optionally coupling the printhead 300 to the arm of the robot 202. If the required adjustment of the printhead 300 approaches the limits of the range of motion of the high-bandwidth actuator 250, then further adjustment of the printhead velocity may be facilitated by adjusting the movement of the robot base 128 along the crossbeam 132 (FIGS. 4-5) and/or by adjusting the movement of the arm of the robot 202.

Adjustment of the printhead velocity may maintain longitudinal correspondence of the new image slice 406 with the existing image slice 408. For example, as described above with regard to printing the numbers “777” that make up the image 400 of FIG. 23, the printhead velocity may be controlled in a manner such that the constant-rate ejection of droplets 330 (e.g., FIGS. 26-27) during printing of each new image slice 406 is started and stopped at the corresponding or same locations as during the printing of the existing image slice 408. Adjustment of the printhead velocity may also provide a means to maintain longitudinal matching of the droplet density and image details of the new image slice 406 with the droplet density and image details of the existing image slice 408. As mentioned above, such image details may include changes in color during the printing of an image slice 404. By maintaining longitudinal correspondence of image slices 404 by continuously tracking the encoding pattern 324 (e.g., FIGS. 28 and 30) of the reference line 322, and by maintaining lateral alignment of image slices 404 by continuously tracking and correcting for the lateral spacing 340 (e.g., FIG. 26) between the reference line 322 and an indexing feature (e.g., the centerline of the camera 327), the visual quality of the completed image 400 may be significantly improved.

Referring to FIG. 30, shown is an example of a reference line 322 in which one or more of the line segments 323 is etched with an individual encoding pattern 324 comprising a series of dash segments 325. The combined end-to-end length of the dash segments 325 may be equivalent to the length of a single line segment 323, and may provide a means to signal to the controller 208 that a start or a stop (e.g., FIG. 23) within the new image slice 406 is approaching. By encoding one or more of the line segments 323 as a plurality of dash segments 325, the controller 208 may more precisely control the printhead 300 to stop or start the constant-rate ejection of droplets 330 to match the starts and stops of a given segment of the existing image slice 408.

As an alternative to ejecting droplets 330 at a constant rate, the controller 208 of the robot 202 may operate the printhead 300 in a manner in which the ejection rate of droplets 330 is modulated in correspondence with the line segments 323 of the existing image slice 408 during the printing of a new image slice 406. For example, the printhead 300 may be operated in a manner to start ejecting droplets 330 at the start of each line segment 323 sensed by the reference line sensor 326. The time period within which the printhead 300 ejects droplets 330 is adjusted such that a predetermined number of droplets 330 are ejected within the time period between the start of each line segment 323 and the end of the gap 321 following the same line segment 323. The time period between the sensing of the start of each line segment 323 to the end of the gap 321 following the same line segment 323 is used as the amount of time allotted for the ejection of the predetermined number of droplets 330 for the next line segment 323 and gap 321. The modulation process adjusts the amount of time between the predetermined number of droplets 330 based on the amount of time between the dashes 321, thereby providing a uniform density of droplets 330 (along a lengthwise direction of the new image slice 406) independent of the velocity of the printhead 300.

Figure 31:
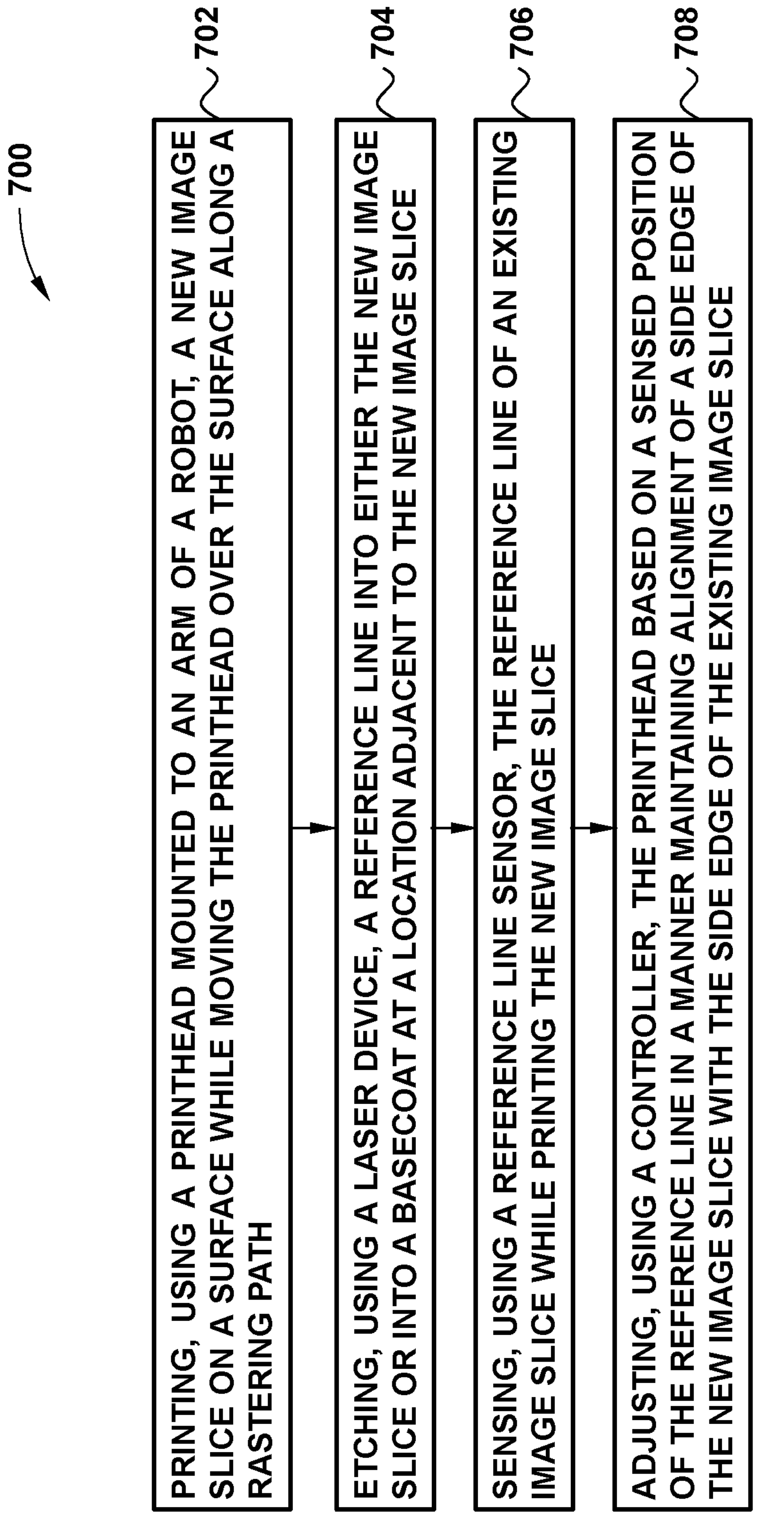
FIG. 31 is a flowchart of operations included in a method of printing an image on a surface using a printhead having a laser device for etching a reference line into either the new image slice or into a basecoat.

FIG. 31 is a flowchart of operations in a method 700 for printing an image 400 on a surface 102 using a printhead 300 having a laser device 342 for etching a reference line 322. Step 702 of the method 700 comprises printing, using a printhead 300 mounted to an arm of a robot 202, a new image slice 406 on the surface 102 while moving the printhead 300 over the surface 102 along a rastering path 350. As mentioned above, the printhead 300 may be an inkjet printhead 300 having one or more rows of nozzles 308 for ejecting droplets 330 of ink, paint, or other colorants onto a surface 102. Alternatively, the printhead 300 may be configured as a dot matrix printer or other printer configuration capable of printing an image 400 on a surface 102.

Step 704 of the method 700 comprises etching, using a laser device 342, a reference line 322 into either the new image slice 406 as shown in FIGS. 24-27, or into a basecoat 103 over which the new image slice 406 is printed as shown in FIGS. 28-30. As mentioned above, reference line 322 may be etched into the new image slice 406 or into the basecoat 103 at a location immediately adjacent to the side edge 416 of the new image slice 406. In some examples, the laser device 342 may be pivotably or translatably mounted to the printhead 300 to allow a user to re-orient the laser device 342 in order to change whether the reference line 322 is etched into the new image slice 406 or alternatively is etched into the basecoat 103. The step 704 of etching the reference line 322 may include etching the reference line 322 into the new image slice 406 or into the basecoat 103 at a line depth 348 of less than approximately 0.005 inch. More preferably, the reference line 322 may be etched at a line depth 348 of less than approximately 0.001 inch. In addition, the reference line 322 may be etched at a line width 346 in the range of approximately 0.002-0.010 inch. By etching the reference line 322 at a relatively small line depth 348 and relatively small line width 346, the reference line 322 may be visually imperceptible after being covered by a layer of clearcoat (not shown).

Step 706 of the method 700 comprises sensing, using a reference line sensor 326, the reference line 322 of an existing image slice 408 while printing the new image slice 406. In some examples, the step 706 of sensing the reference line 322 may comprise emitting, using an optical sensor, an optical beam 328 toward the reference line 322 as shown in FIG. 16. The method may further include generating, using the optical sensor, a signal representing a lateral location where the optical beam 328 strikes the reference line 322. The method may additionally include transmitting the signal to the controller 208 of the robot 202 to allow the controller 208 to adjust the printhead 300 in a manner maintaining alignment of the side edge 416 of the new image slice 406 with the side edge 416 of the existing image slice 408.

In a further example shown in FIG. 26, the step 706 of sensing the reference line 322 may comprise illuminating, using a light source 329, the reference line 322 and a surrounding area during printing of a new image slice 406. As mentioned above, the light source 329 may be coupled to the printhead 300 and may be oriented in a manner such that the emitted light is reflected off of the surface into which the reference line 322 is etched. The light source 329 may continuously illuminate the reference line 322 and the surrounding area during printing of the new image slice 406. The method may additionally include receiving, at a camera 327 (e.g., a monochrome camera 327), the light emitted by the light source 329 and reflected off of the reference line 322 and the surrounding area. The method may additionally include determining, using the camera 327, the lateral location of the reference line 322 based on variations in specular reflectivity of the light emitted by the light source 329. The camera 327 may generate a signal representative of the lateral location of the reference line 322 relative to an indexing feature such as a vertical centerline of the camera 327, and may transmit the signal to the controller 208 of the robot 202 to allow the controller 208 to adjust the printhead 300 in a manner maintaining alignment of the new image slice 406 with the existing image slice 408, as described below.

Step 708 of the method 700 comprises adjusting, using the controller 208, the printhead 300 based on a sensed position of the reference line 322 in a manner maintaining alignment of a side edge 416 of the new image slice 406 with the side edge 416 of the existing image slice 408. For example, the step 708 of adjusting the printhead 300 may comprise physically adjusting the lateral position of the printhead 300 such that the side edge 416 of the new image slice 406 image slice 404 is maintained in non-gapped and non-overlapping relation with the side edge 416 of the existing image slice 408. As an alternative to physically adjusting the lateral position of the printhead 300, the step 708 of adjusting the printhead 300 may comprise electronically offsetting or shifting nozzles 308 or groups of nozzles 308 actively ejecting droplets 330 in a manner such that the side edge 416 of the new image slice 406 is maintained in non-gapped and non-overlapping relation with the side edge 416 of the existing image slice 408. In a still further example, the method may include a combination of adjusting the lateral position of the printhead 300, and electronically shifting nozzles 308 actively ejecting droplets 330.

In some examples, the step 708 of adjusting the printhead 300 may include adjusting the position of the printhead 300 using at least one high-bandwidth actuator 250 coupling the printhead 300 to an end 214 of the second arm 212, as shown in FIGS. 17-20. The adjustment of the printhead 300 using the high-bandwidth actuator 250 may include translating the printhead 300 along a lateral or transverse direction 354 (FIG. 25) parallel to the surface 102 and perpendicular to the rastering path 350, translating the printhead 300 along a normal direction 356 (FIG. 25) normal to the surface 102, and/or rotating the printhead 300 along a roll direction 358 (FIG. 25) about an axis parallel to the rastering path 350. FIG. 18 shows an example of a high-bandwidth actuator 250 comprised of a first actuator 250*a*, a second actuator 250*b*, and a third actuator 250*c* arranged in an in-plane tripod configuration. As described above, the lower end of the second actuator 250*b* may be located adjacent to the lower end of the third actuator 250*c* such that the second actuator 250*b* extends diagonally between the upper end of the first actuator 250*a* and the lower end of the third actuator 250*c*. The arrangement of the first actuator 250*a*, second actuator 250*b*, and third actuator 250*c* enables the adjustment of the printhead 300 along the transverse direction 354, the normal direction 356, and the roll direction 358.

Referring briefly to FIGS. 28 and 30, shown is an example of the system 200 in which the reference line 322 is etched with an encoding pattern 324 comprising a series of line segments 323 forming a dashed line. The line segments 323 may be of uniform length and uniform spacing and may be separated by gaps of uniform length. The reference line sensor 326 may sense the line segments 323 and transmit to the robot 202 a signal representative of the sensed line segments 323. The method may include determining, using the controller 208 of the robot 202, the printhead velocity during the printing of a new image slice 406. The determination of the printhead velocity may be based on the rate at which the line segments 323 are sensed by the reference line sensor 326 during printing of the new image slice 406 while ejecting droplets 330 at a constant rate. The method may further include adjusting, using the robot 202, the printhead velocity such that the printhead 300 is maintained at substantially the same (e.g., within 1 percent) printhead velocity as during the printing of the existing image slice 408. As mentioned above, the controller 208 may record the printhead velocity during printing of the existing image slice 408 for comparison to the printhead velocity during the printing of the new image slice 406.

The adjustment of the printhead velocity may be performed using a high-bandwidth actuator 250 (FIGS. 17-20). If approaching the limits of the range of motion of the high-bandwidth actuator 250, the adjustment of the printhead velocity may be performed by adjusting the movement of the robot 202 base 128 along the crossbeam 132 (e.g., FIGS. 4-5) and/or by adjusting the movement of an arm of the robot 202. As mentioned above, matching the printhead velocity during printing of the new image slice 406 with the printhead velocity during printing of the existing image slice 408 provides a means to maintain longitudinal correspondence of the droplet density and image details of the new image slice 406 with the droplet density and image details of the existing image slice 408. Referring briefly to FIG. 30, the method may include etching one or more of the line segments 323 as a series of dash segments 325 as a means to signal to the controller 208 that an end of at least a portion of the image slice 404 is approaching, allowing the controller 208 to operate the printhead 300 to stop or start the ejection of droplets 330 at the appropriate time to substantially match (e.g., within 0.010 inch) the existing image slice 408.

As an alternative to adjusting the printhead velocity for a printhead 300 with constant-rate ejection of droplets 330, the method may include operating the printhead 300 in a manner in which the ejection rate of droplets 330 is modulated during printing of the new image slice 406. In this regard, as mentioned above, the ejection of droplets 330 is started in correspondence with the start of each one of the line segments 323 of the existing image slice 408, and is spaced in time such that eject a predetermined number of droplets 330 are ejected by the end of the gap 321 following the same line segment 323.

Referring briefly to FIGS. 26-27, the method may include periodically or continuously measuring, using at least one position sensor 314 coupled to the printhead 300, the normal spacing 338 between the printhead face 304 and the surface 102 along a direction locally normal to the surface 102. The method may additionally include periodically or continuously adjusting, during printing of the new image slice 406, the position of the printhead 300 based on the normal spacing 338 measured by the position sensor 314 in a manner to maintain the normal spacing 338 at a constant value. The adjustment of the position of the printhead 300 may include adjusting the lateral location of the printhead 300 and/or adjusting the orientation about the printhead 300 relative to the surface 102 locally. In some examples, the printhead 300 may be adjusted in a manner to maintain the printhead face 304 within approximately 0.010 inch of a predetermined value of the normal spacing 338 as a means to provide consistency of droplet application onto the surface 102 across the width of the printhead 300. In addition, maintaining the normal spacing 338 at a constant value during printing of a new image slice 406 may improve the longitudinal matching of the image details (not shown) of the new image slice 406 with the image details of the existing image slice 408, and may improve the accuracy with which the side edge 416 of the new image slice 406 is maintained in non-gapped and non-overlapping relation with the side edge 416 of the existing image slice 408.

The method may additionally include measuring, using at least three positions sensors 314, the normal spacing 338 at different locations on the printhead 300. For example, four position sensors 314 may be arranged in a rectangular pattern around the printhead 300. The method may include adjusting the orientation of the printhead 300 based on the normal spacing 338 sensed by the position sensors 314. The orientation of the printhead 300 may be adjusted in a manner maintaining the printhead 300 locally parallel to the surface 102 upon which the new image slice 406 is being printed. Maintaining the printhead 300 locally parallel to the surface 102 may maintain all of the nozzles 308 across the printhead width 302 at approximately same spacing from the surface 102, which may improve the consistency with which the droplets 330 are deposited onto the surface 102 to thereby improve the image 400 quality.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for printing an image on a surface, comprising:

a robot having at least one arm;

a printhead mounted to the arm and being movable by the arm over a surface along a rastering path while printing a new image slice over the surface;

a laser device included with the printhead and configured to etch, during printing of the new image slice, a reference line into either the new image slice or into a basecoat at a location adjacent to the new image slice; and a reference line sensor configured to sense the reference line of an existing image slice and transmit a signal to the robot causing the arm to adjust the printhead in a manner such that a side edge of the new image slice is aligned with the side edge of the existing image slice.

2. The system of claim 1, wherein:

the robot is configured to adjust a lateral position of the printhead in a manner such that the side edge of the new image slice is maintained in non-gapped and non-overlapping relation with the side edge of the existing image slice.

3. The system of claim 1, wherein:

the robot is configured to electronically offset nozzles actively ejecting droplets in a manner such that the side edge of the new image slice is maintained in non-gapped and non-overlapping relation with the side edge of the existing image slice.

4. The system of claim 1, wherein:

the reference line sensor is an optical sensor configured to emit an optical beam and generate a signal representing a lateral location where the optical beam strikes the reference line, and provide real-time alignment feedback to the robot for adjusting the printhead in a manner such that the side edge of the new image slice is maintained in alignment with the side edge of the existing image slice.

5. The system of claim 1, wherein the reference line sensor is a camera, the system further including:

a light source configured to illuminate the reference line and a surrounding area during printing of the new image slice; and the camera configured to receive the light emitted by the light source after reflection off of the reference line and the surrounding area, the camera configured to transmit to the robot a signal for determination by the robot of a lateral location of the reference line based on variations in specular reflectivity of the light emitted by the light source for adjustment of the printhead in a manner such that the side edge of the new image slice is maintained in alignment with the side edge of the existing image slice.

6. The system of claim 1, wherein:

the laser device is configured to etch the reference line as a series of line segments;

the reference line sensor configured to sense the line segments and transmit the signal to the robot; and the robot configured to determine, based on a rate at which the line segments are sensed as represented by the signal, a printhead velocity during the printing of the new image slice, and adjust the robot such that the printhead is maintained at substantially a same printhead velocity as during the printing of the existing image slice.

7. The system of claim 1, wherein:

the laser device is configured to etch the reference line as a series of line segments;

the reference line sensor configured to sense the line segments and transmit the signal to the robot; and the robot configured to operate the printhead in a manner in which an ejection rate of droplets for the new image slice is modulated in correspondence with the line segments of the existing image slice during printing of the new image slice.

8. The system of claim 1, further including:

at least one high-bandwidth actuator coupling the printhead to an end of the arm; and the high-bandwidth actuator configured to adjust at least one of an orientation and a position of the printhead relative to the surface during movement of the printhead along the rastering path.

9. The system of claim 1, further including:

at least one position sensor coupled to the printhead and configured to measure a normal spacing between the printhead and the surface along a direction locally normal to the surface; and the robot configured to adjust, during printing of the new image slice, a position of the printhead based on the normal spacing measured by the position sensor in such a manner maintaining the normal spacing at a constant value.

10. A system for printing an image on a surface, comprising:

a robot having at least one arm;

a high-bandwidth actuator coupled to an end of the arm;

an inkjet printhead coupled to the high-bandwidth actuator and being movable by the arm over a surface along a rastering path while printing a new image slice over the surface;

a laser device included with the printhead and configured to etch, during printing of the new image slice, a reference line into either the new image slice or into a basecoat at a location adjacent to the new image slice; and a camera configured to sense the reference line of an existing image slice and transmit a signal to the robot causing the high-bandwidth actuator to adjust the printhead in a manner such that a side edge of the new image slice is maintained in alignment with the side edge of the existing image slice.

11. A method for printing an image on a surface, comprising:

printing, using a printhead mounted to an arm of a robot, a new image slice on the surface while moving the printhead over the surface along a rastering path;

etching, using a laser device, a reference line into either the new image slice or into a basecoat while printing the new image slice;

sensing, using a reference line sensor, the reference line of an existing image slice while printing the new image slice; and adjusting, using a controller, the printhead based on a sensed position of the reference line in a manner maintaining alignment of a side edge of the new image slice with the side edge of the existing image slice.

12. The method of claim 11, wherein the step of adjusting the printhead comprises:

adjusting a lateral position of the printhead such that the side edge of the new image slice is maintained in non-gapped and non-overlapping relation with the side edge of the existing image slice.

13. The method of claim 11, wherein the step of adjusting the printhead comprises:

electronically offsetting groups of nozzles actively ejecting droplets in a manner such that the side edge of the new image slice is maintained in non-gapped and non-overlapping relation with the side edge of the existing image slice.

14. The method of claim 11, wherein the step of sensing the reference line comprises:

emitting, using an optical sensor, an optical beam toward the reference line;

generating, using the optical sensor, a signal representing a lateral location where the optical beam strikes the reference line; and transmitting the signal to the robot for adjusting the printhead in a manner maintaining alignment of the side edge of the new image slice with the side edge of the existing image slice.

15. The method of claim 11, wherein the step of sensing the reference line comprises:

illuminating, using a light source, the reference line and a surrounding area during printing of the new image slice; and receiving, using a camera, the light emitted by the light source and reflected off the reference line and the surrounding area;

determining, using the camera, a lateral location of the reference line based on variations in specular reflectivity of the light emitted by the light source, and generating a signal representative thereof; and transmitting the signal to the robot for adjusting the printhead in a manner maintaining alignment of the side edge of the new image slice with the side edge of the existing image slice.

16. The method of claim 11, wherein the reference line is etched as a series of line segments, the method further comprising:

determining, using the robot, a printhead velocity during printing of the new image slice based on a rate at which the line segments are sensed; and adjusting, using the robot, the printhead velocity such that the printhead is maintained at substantially a same printhead velocity as during printing of the existing image slice.

17. The method of claim 11, wherein the reference line is etched as a series of line segments, the method further comprising:

operating the printhead in a manner in which an ejection rate of droplets for the new image slice is modulated in correspondence with the line segments of the existing image slice during printing of the new image slice.

18. The method of claim 11, wherein the step of adjusting the printhead comprises:

adjusting the lateral position of the printhead using at least one high-bandwidth actuator coupling the printhead to an end of the arm.

19. The method of claim 11, further including:

measuring, using at least one position sensor, a normal spacing between the printhead and the surface along a direction locally normal to the surface; and adjusting, during printing of the new image slice, a position of the printhead based on the normal spacing measured by the position sensor in such a manner maintaining the normal spacing at a constant value.

20. The method of claim 19, wherein measuring the normal spacing and adjusting the position of the printhead respectively comprise:

measuring, using at least three positions sensors, the normal spacing at different locations on the printhead; and adjusting an orientation of the printhead based on the normal spacing sensed by the position sensors in a manner maintaining the printhead locally parallel to the surface during printing of the new image slice.

* * * * *